United States Patent
Paladugu et al.

(10) Patent No.: US 12,477,572 B2
(45) Date of Patent: Nov. 18, 2025

(54) PARALLEL HANDOVER AND FAILURE HANDLING

(71) Applicant: Qualcomm Incorporated, San Diego, CA (US)

(72) Inventors: Karthika Paladugu, San Diego, CA (US); Xipeng Zhu, San Diego, CA (US); Kuo-Chun Lee, San Diego, CA (US); Arvind Vardarajan Santhanam, San Diego, CA (US); Ruiming Zheng, Beijing (CN); Huichun Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 847 days.

(21) Appl. No.: 17/764,877

(22) PCT Filed: Oct. 2, 2019

(86) PCT No.: PCT/CN2019/109799
§ 371 (c)(1),
(2) Date: Mar. 29, 2022

(87) PCT Pub. No.: WO2021/062863
PCT Pub. Date: Apr. 8, 2021

(65) Prior Publication Data
US 2022/0394571 A1    Dec. 8, 2022

(51) Int. Cl.
*H04W 74/02* (2009.01)
*H04W 36/00* (2009.01)

(52) U.S. Cl.
CPC ..... *H04W 74/02* (2013.01); *H04W 36/00692* (2023.05)

(58) Field of Classification Search
CPC ........... H04W 36/00692; H04W 74/02; H04W 36/0077
See application file for complete search history.

(56) References Cited

U.S. PATENT DOCUMENTS 9,622,134 B2    4/2017    Sundararajan et al.
2011/0268090 A1*  11/2011  Qu ................. H03M 13/136
                                                370/335
(Continued)

FOREIGN PATENT DOCUMENTS

CN    101047967 A    10/2007
CN    104822169 A     8/2015
(Continued)

OTHER PUBLICATIONS

International Search Report and Written Opinion—PCT/CN2019/109799—ISA/EPO—Jun. 23, 2020.
(Continued)

*Primary Examiner* — Ayaz R Sheikh
*Assistant Examiner* — Tarell A Hampton
(74) *Attorney, Agent, or Firm* — QUALCOMM Incorporated

(57) ABSTRACT

Methods (1500, 1600, 1700, 1800, 1900), systems (1000, 1400) and devices (705, 805, 1005, 1105, 1205, 1405) for wireless communications are presented. A method (1500, 1600) may include the following operations. A UE determines to perform a handover from a first source device in a first network to a first target device in the first network and from a second source device in a second network to a second target device in the second network (1505, 1605). The UE identifies a time interval for performing a first random access procedure with the first target device in the first network (1510, 1610). The UE initiates a first random access procedure with the first target device (1515, 1615). The UE performs a second random access procedure successfully with the second target device in the second network during the time interval (1520, 1620). The UE transmits or receives from the target device in the second network before the UE (Continued)

finishes performing the first random access procedure with the first target device in the first network (1525, 1630).

33 Claims, 19 Drawing Sheets

(56) References Cited

U.S. PATENT DOCUMENTS

| | | | | |
|---|---|---|---|---|
| 2014/0286243 | A1* | 9/2014 | Yamada | H04W 76/15 |
| | | | | 370/329 |
| 2015/0173047 | A1* | 6/2015 | Yamada | H04W 76/15 |
| | | | | 370/329 |
| 2015/0223270 | A1* | 8/2015 | Kim | H04W 74/0833 |
| | | | | 370/329 |
| 2015/0271768 | A1* | 9/2015 | Jang | H04W 52/30 |
| | | | | 370/329 |
| 2016/0150586 | A1* | 5/2016 | Lei | H04W 36/0235 |
| | | | | 370/332 |
| 2016/0205705 | A1* | 7/2016 | Chen | H04W 74/0833 |
| | | | | 370/328 |
| 2016/0212770 | A1* | 7/2016 | Lee | H04B 7/2612 |
| 2016/0227459 | A1* | 8/2016 | Fujishiro | H04W 36/06 |
| 2016/0302256 | A1 | 10/2016 | Susitaival et al. | |
| 2016/0338140 | A1 | 11/2016 | Zhang et al. | |
| 2017/0034866 | A1* | 2/2017 | Wager | H04W 76/20 |
| 2017/0055187 | A1* | 2/2017 | Kang | H04W 36/0058 |
| 2017/0171825 | A1* | 6/2017 | Takeda | H04W 52/50 |
| 2017/0195935 | A1* | 7/2017 | Xu | H04W 76/15 |
| 2017/0245181 | A1* | 8/2017 | Zhang | H04W 36/08 |
| 2018/0160376 | A1* | 6/2018 | Hwang | H04W 52/146 |
| 2018/0332507 | A1* | 11/2018 | Fujishiro | H04W 36/00692 |
| 2019/0045565 | A1* | 2/2019 | Wu | H04W 76/15 |
| 2019/0045567 | A1* | 2/2019 | Wu | H04W 36/085 |
| 2019/0182732 | A1* | 6/2019 | Wei | H04W 36/0066 |
| 2019/0268818 | A1 | 8/2019 | Yi et al. | |
| 2020/0029389 | A1* | 1/2020 | Yilmaz | H04W 8/08 |
| 2022/0038968 | A1* | 2/2022 | Latheef | H04W 24/10 |
| 2022/0110076 | A1* | 4/2022 | Shimoda | H04W 72/0446 |
| 2022/0287126 | A1* | 9/2022 | Orsino | H04W 76/20 |
| 2022/0394583 | A1* | 12/2022 | Deenoo | H04W 76/20 |

FOREIGN PATENT DOCUMENTS

| | | |
|---|---|---|
| CN | 105027617 A | 11/2015 |
| CN | 105191403 A | 12/2015 |
| CN | 105981438 A | 9/2016 |
| CN | 106413008 A | 2/2017 |
| CN | 107079514 A | 8/2017 |
| CN | 109151932 A | 1/2019 |
| CN | 110099419 A | 8/2019 |
| WO | WO-2014182714 | 11/2014 |

OTHER PUBLICATIONS

Supplementary European Search Report—EP19947665—Search Authority—Munich—May 23, 2023.

* cited by examiner

US 12,477,572 B2

PARALLEL HANDOVER AND FAILURE HANDLING

CROSS REFERENCE

The present Application is a 371 national stage filing of International PCT Application No. PCT/CN2019/109799 by Paladugu et al., entitled "PARALLEL HANDOVER AND FAILURE HANDLING," filed Oct. 2, 2019, which is assigned to the assignee hereof, and which is expressly incorporated by reference in its entirety herein.

FIELD OF TECHNOLOGY

The following relates generally to wireless communications and more specifically to parallel handover and failure handling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a user equipment (UE) may operate in dual connectivity (DC) with a first node and a second node. Operating in DC may involve the UE being capable of simultaneously transmitting data to or receiving data from the first and second nodes. In some cases, the first and second nodes may operate on different networks. For instance, the first node may operate in LTE and the second node may operate in NR.

SUMMARY

The described techniques relate to improved methods, systems, devices, and apparatuses that support parallel handover and failure handling. Generally, the described techniques provide for a user equipment (UE) to determine to perform a handover from a first source device in a first network to a first target device in the first network and from a second source device in a second network to a second target device in the second network. The UE may identify a time interval for performing a first random access procedure with the first target device and may initiate a first random access procedure with the first target device in the first network. The UE may perform a second random access procedure successfully with the second target device in the second network during the time interval and may transmit or receive from the target device in the second network before the UE finishes performing the first random access procedure with the first target device in the first network.

DETAILED DESCRIPTION

Figure 1:
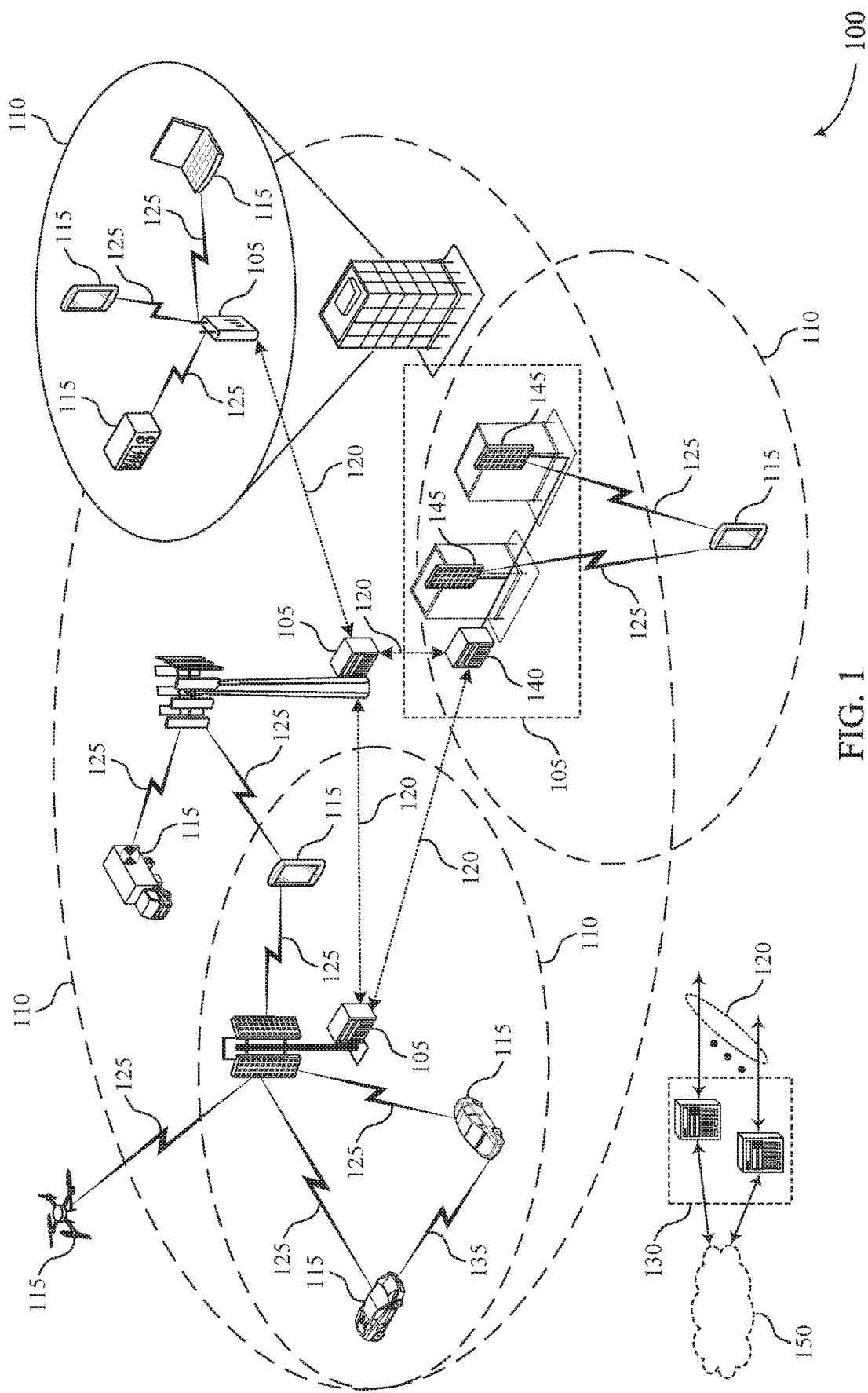
FIG. 1 illustrates an example of a wireless communications system that supports parallel handover and failure handling in accordance with aspects of the present disclosure.

A user equipment (UE) may operate in dual connectivity (DC) with a master node (MN) and a secondary node (SN). As the UE changes position, the UE may receive a request to perform handover from the original MN, which may be referred to as a source MN, to a new MN, which may be referred to as a target MN. The request may also indicate to perform handover from the original SN, which may be referred to as a source SN, to a new SN, which may be referred to as a target SN.

As part of performing handover, the UE may perform a random access procedure with the target MN and the target SN. Typically, the UE may wait to perform the random access procedure with the target SN until after successfully performing the random access procedure with the MN. However, waiting to perform the random access procedure with the target SN until after performing the random access procedure with the target MN may increase a time duration associated with performing handover.

To decrease the time duration associated with performing the random access procedure, the UE may initiate random access procedures with the target SN and the target MN in parallel. Assuming that the UE performs the random access procedure with the target SN successfully, the UE may perform data transfer with the target SN. To ensure that the target SN has data to transfer to the UE while the UE continues to perform the random access procedure with the target MN, the target SN may forward data through the target MN to the source MN, which the source MN may transmit to the UE.

In the event that the UE fails to perform the random access procedure with the target MN, the UE, typically, may revert to a packet data convergence protocol (PDCP) state used when communicating with the source MN before performing handover. However, if the UE has already transmitted data to the target SN or has already received data from the target SN, the UE may end up retransmitting data successfully received and decoded by the target SN to the source MN or may receive duplicates of data already successfully received and decoded by the UE. Retransmitting data or receiving duplicates may increase the inefficiency associated with performing communications.

To avoid such scenarios, the UE, upon failing to perform the random access procedure with the target MN, may transmit a report to the source MN that indicates packets successfully received and decoded by the UE. The source MN may receive the report and may avoid retransmitting duplicates for the packets that have been successfully received and decoded by the UE. Additionally or alternatively, the target SN, upon determining that the UE has failed to perform the random access procedure with the target MN, may transmit an indication of packets successfully received and decoded by the target SN to the target MN, which may provide the indication to the source MN. The source MN may construct a report based on the indication and may transmit the report to the UE, which the UE may use to avoid retransmitting duplicates to the network.

As noted above, performing random access procedures in parallel with target MNs and target SNs may lower a time duration associated with performing handover. Additionally, in cases where the random access procedure with the target SN is finished while the UE is still performing the random access procedure with the MN, the UE may be able to perform data transfer prior to finishing the random access procedure with the target MN. In such cases, data may be capable of being transferred earlier than in cases where a UE finishes a random access procedure with a target MN first before beginning a random access procedure with a target SN. Additionally, by the target SN and/or UE providing a report corresponding to packets that have been successfully received in cases where the random access procedure with the target MN fails, the UE and source MN may avoid performing redundant communications.

Aspects of the disclosure are initially described in the context of wireless communications systems. Additional aspects of the disclosure may be described in the context of an additional wireless communications system, communications schemes, and a process flow. Aspects of the disclosure are further illustrated by and described with reference to apparatus diagrams, system diagrams, and flowcharts that relate to parallel handover and failure handling.

FIG. 1 illustrates an example of a wireless communications system 100 that supports parallel handover and failure handling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may determine to perform a handover from a first source device in a first network (e.g., a base station 105) to a first target device in the first network (e.g., another base station 105) and from a second source device in a second network (e.g., a base station 105) to a second target device in the second network (e.g., another base station 105). The UE 115 may identify a time interval for performing a first random access procedure with the first target device and may initiate a first random access procedure with the first target device in the first network. The UE 115 may perform a second random access procedure successfully with the second target device in the second network during the time interval and may transmit or receive from the target device in the second network before the UE 115 finishes performing the first random access procedure with the first target device in the first network.

Figure 2:
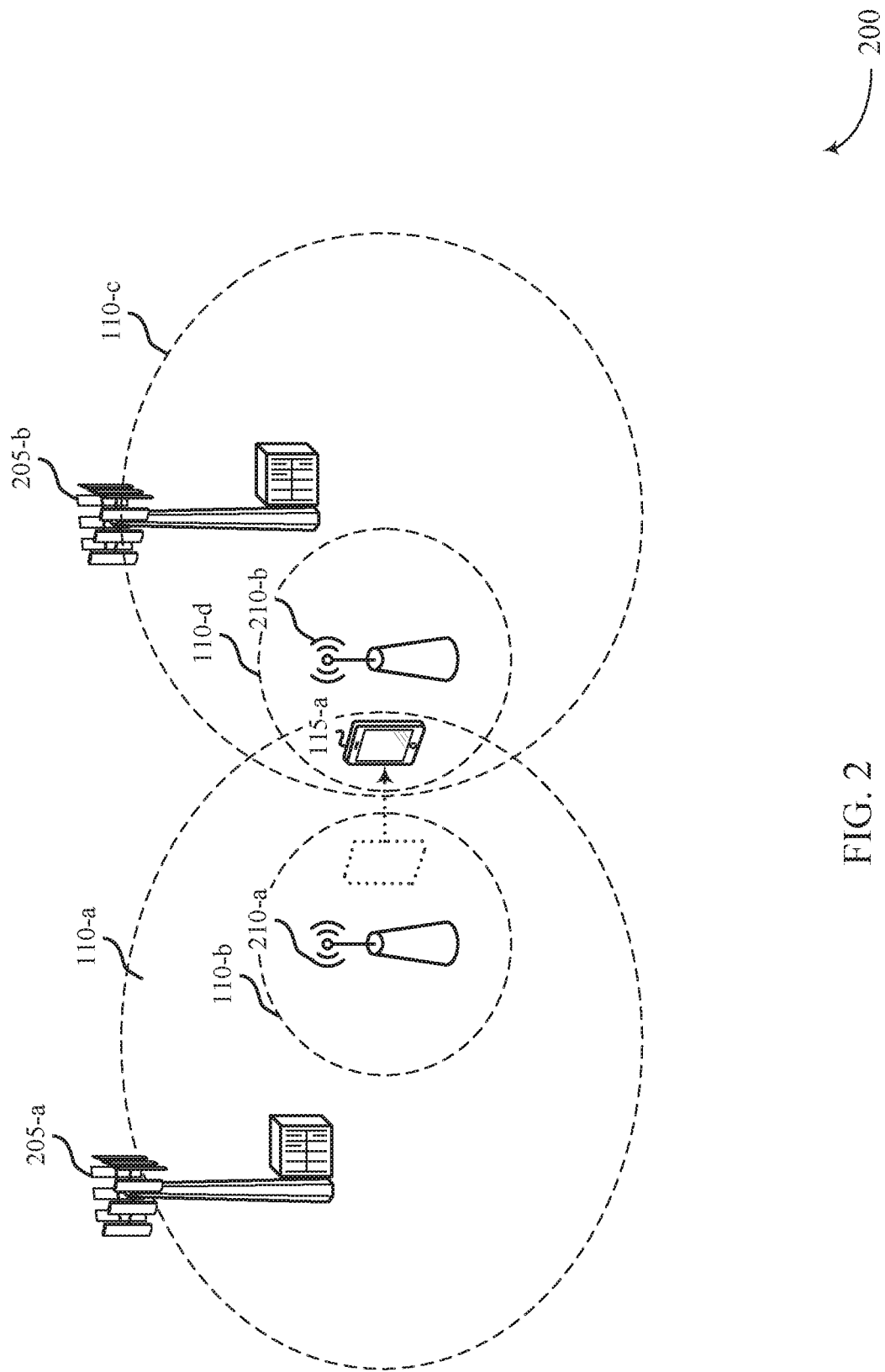
FIG. 2 illustrates an example of a wireless communications scheme that supports parallel handover and failure handling in accordance with aspects of the present disclosure.

FIG. 2 illustrates an example of a wireless communications system 200 that supports parallel handover and failure handling in accordance with aspects of the present disclosure. In some examples, wireless communications system 200 may implement aspects of wireless communications system 100. For instance, UE 115-*a* may be an example of a UE 115 as described with reference to FIG. 1. and MN 205-*a*, MN 205-*b*, SN 210-*a*, and SN 210-*b* may be examples of base stations 105 as described with reference to FIG. 1.

Initially, UE 115-*a* may be within a coverage area 110-*a* of master node (MN) 205-*a* and a coverage area of secondary node (SN) 210-*a*. MN 205-*a* may operate within a first network (e.g., LTE) and SN 210-*a* may operate within a second network (e.g., NR). In some cases, UE 115-*a* may support dual connectivity (DC), with MN 205-*a* and SN 210-*a*. In such cases, UE 115-*a* may be capable of transmitting transmissions to or receiving transmissions from MN 205-*a* and SN 210-*a* simultaneously.

One form of DC that UE 115-*a* may support is multi-radio DC (MR-DC), which may also be referred to as multi-RAT DC. In one scenario, UE 115-*a* may support MR-DC while communicating according to the evolved packet core (EPC). For instance, UE 115-*a* may support E-UTRA-NR DC (EN-DC), which may involve MN 205-*a* operating within an E-UTRA network and SN 210-*a* operating within an NR network. In another scenario, UE 115-*a* may support MR-DC while communicating according to the 5G core (5GC). For instance, UE 115-*a* may support next-generation radio access network (NG-RAN)-E-UTRA DC (NGEN-DC); NR-E-UTRA DC (NE-DC); or NR-DR DC (NR-DC). For EN-DC, NGEN-DC, and NE-DC, each node operating in DC with UE 115-*a* may belong to a different radio access technology (RAT) (e.g., LTE or NR).

In some cases, UE 115-*a* may receive a request from MN 205-*a* to perform handover from MN 205-*a* to MN 205-*b* (e.g., from a source MN 205 to a target MN 205) and/or from SN 210-*a* to SN 210-*b* (e.g., from a source SN 210 to a target SN 210). MN 205-*b* may operate within the first network and SN 210-*b* may operate within the second network. MN 205-*a* may transmit the request to UE 115-*a* based on a mobility of UE 115-*a*. For instance, MN 205-*a* may transmit the request if UE 115-*a* enters a coverage area 110 of another MN 205 (e.g., coverage area 110-c) and/or if UE 115-a is approaching an end of coverage area 110-a or 110-b. Details covering how the handover is performed may be described in further detail with regards to FIG. 3. After performing the handover successfully, UE 115-a may be capable of transmitting transmissions to or receiving transmissions from MN 205-b and SN 210-b successfully.

Performing handover may involve UE 115-a performing random access procedures with MN 205-b and SN 210-b. One technique may involve initiating a random access procedure with SN 210-b after a random access procedure with or handover to MN 205-b is successful. However, by waiting for the random access procedure with or handover to MN 205-b to be successful, UE 115-a may experience throughput degradation during handover. Additionally, in cases where setting up a link with SN 210-b is faster than setting up a link with MN 205-b, UE 115-b may miss an opportunity to leverage the SN link for data transfer while a random access procedure with MN 205-b is still underway.

To limit throughput degradation and/or to enable UE 115-b to transfer data with SN 210-b while the random access procedure with MN 205-b is still underway, UE 115-b may initiate a random access procedure or link setup for SN 210-b in parallel with the random access procedure or link setup for MN 205-b. Techniques for performing the random access procedures in parallel may be described with reference to FIGS. 3-5.

Figure 3:
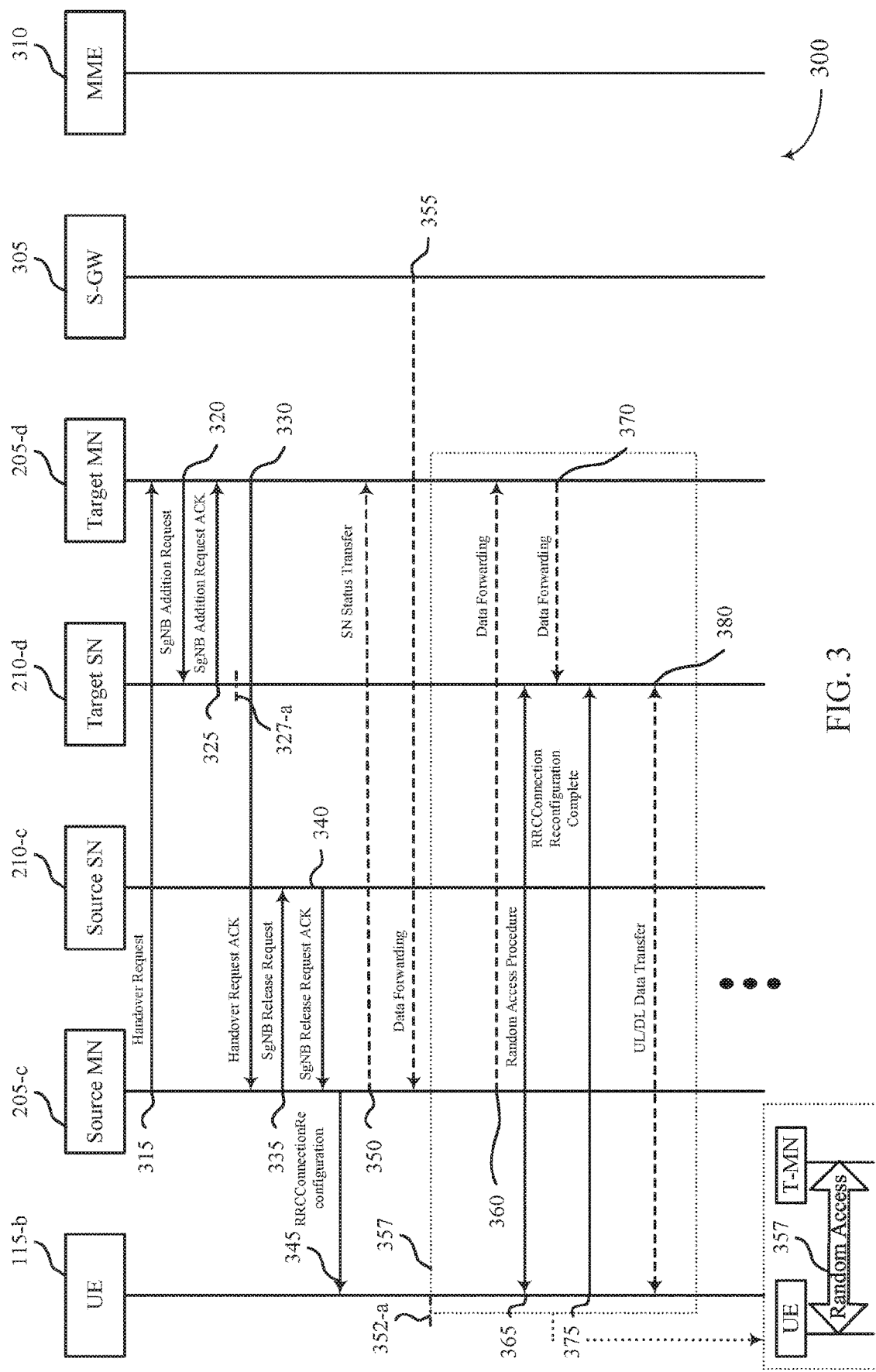
FIG. 3 illustrates an example of an inter-master-node (MN) call flow that supports parallel handover and failure handling in accordance with aspects of the present disclosure.

FIG. 3 illustrates an example of an inter-MN call flow 300 with an MN-initiated SN change that supports parallel handover and failure handling in accordance with aspects of the present disclosure. In some examples, inter-MN call flow 300 may implement aspects of wireless communications systems 100 and 200. For instance, UE 115-b may be an example of a UE 115 as described with reference to FIG. 1. Additionally, source MN 205-c and target MN 205-d may be examples of an MN as described with reference to FIG. 2 and source SN 210-c and target SN 210-d may be examples of an SN 210 as described with reference to FIG. 2.

Initially, UE 115-b may be capable of transmitting transmissions or receiving transmissions from the source MN 205-c and the source SN 210-c simultaneously. Source MN 205-c may be capable of communicating with target MN 205-d (e.g., via an X2 interface or a wireless backhaul link). Source MN 205-c and target MN 205-d may be capable of communicating with S-GW 305 and MME 310.

At 315, source MN 205-c may transmit a handover request to target MN 205-d. Target MN 205-d, after receiving the handover request, may transmit an SgNB addition request to target SN 210-d at 320. The SgNB addition request may allocate resources for a DC connectivity operation for UE 115-b or may otherwise indicate a DC configuration. Target SN 210-d, after receiving the SgNB addition request, may transmit an acknowledgement (ACK) for the SgNB addition request to target MN 205-d at 325. Additionally, target SN 210-d may start timer $TXn_{DCoverall}$ at 327-a, which may indicate and track a maximum amount of time for UE 115-b to receive an indication that the DC configuration was successfully applied by UE 115-b and/or that target MN 205-d successfully completed a random access procedure with UE 115-b (e.g., an SgNBReconfigurationComplete message). In some cases (e.g., if SN 210-d is an NG-RAN node), $TXn_{DCoverall}$ may specify the maximum time in target SN 210-d for either a NG-RAN SN modification procedure initiated by SN 210-d or the protection of the NG-RAN actions used to configure resources for UE 115-b during NG-RAN SN addition or NG-RAN MN node initiated NG-RAN SN node modification. Use cases for timer $TXn_{DCoverall}$ may be described with reference to FIGS. 4 and 5. At 330, target MN 205-d may transmit an ACK for the handover request to source MN 205-c.

Upon receiving the ACK transmitted at 330, source MN 205-c may transmit an SgNB release request to source SN 210-c. SgNB release request may indicate to source SN 210-c to stop providing user data to UE 115-b. Upon receiving the SgNB release request, source SN 210-c may transmit an ACK for the SgNB release request at 340 to source MN 205-c. After receiving the ACK, source MN 205-c may transmit an RRC connection reconfiguration message (e.g., an RRCConnectionReconfiguration message) to UE 115-b at 345. The RRC connection reconfiguration message may indicate a DC configuration corresponding to target MN 205-d and target SN 210-d.

After receiving the RRC connection reconfiguration message, UE 115-b may initiate a random access procedure with target MN 205-d, which, in the present example, may span a time indicated by 357. UE 115-b may perform random access procedures to obtain uplink timing information and/or to initiate a data transfer. For a 2-step random access procedure, UE 115-b may transmit a first message containing a random access preamble and a random access payload (i.e., msgA) to target MN 205-d and may receive a second message containing a random access response and/or contention resolution information (i.e., msgB). If UE 115-b transmits msgA and successfully receives and decodes msgB, UE 115-b may determine that it has successfully completed the 2-step random access procedure. For a 4-step random access procedure, UE 115-b may transmit a first message containing a random access preamble (i.e., msg1) to target MN 205-d and may receive a second message containing a random access response (i.e., msg2). After receiving the random access response, UE 115-b may transmit a third message containing a random access payload (i.e., msg3) to target MN 205-d and may receive a fourth message containing contention resolution information (i.e., msg4). If UE 115-b successfully receives and decodes msg2 and ms4, in cases in which msg4 is sent, UE 115-b may successfully complete the 4-step random access procedure. If UE 115-b is performing a contention-based random access (CBRA) procedure, UE 115-b may receive the contention resolution information. However, if UE 115-b is performing a contention-free random access (CFRA) procedure, UE 115-b may not receive the contention resolution information (e.g., may not receive msg4 or may receive a msgB that does not include contention resolution information) and may determine that the random access procedure has succeeded without receiving contention resolution information.

When initiating the random access procedure, UE 115-b may start a timer MN_T304 at 352-a, which may indicate and track a maximum amount of time for finishing the random access procedure with target MN 205-d. If MN_T304 runs out before UE 115-b successfully performs a random access procedure, as described herein, UE 115-b may determine that the random access procedure has failed. Use cases for timer MN_T304 may be described with reference to FIGS. 4 and 5.

UE 115-b may additionally, at 365, initiate a random access procedure for the target SN 210-d in parallel with the random access procedure for the target MN 205-d. The random access procedure with target SN 210-d may be performed in a similar manner as described with reference to target MN 205-d. In some cases, upon finishing the random access procedure with target SN 210-d, UE 115-b may transmit an RRC connection reconfiguration complete message (e.g., an RRCConnectionReconfigurationComplete message) to target SN 210-d. The RRC connection reconfiguration complete message may indicate that the UE has successfully applied the DC configuration indicated by the RRC connection reconfiguration message. The RRC connection reconfiguration complete message may be transmitted to target SN 210-d on signaling resource bearer (SRB) 3 (i.e., SRB3) or a split SRB.

Additionally or alternatively, if UE 115-b performs a contention-free random access (CFRA) procedure, base station 105-b may determine that the DC configuration was successfully applied based on UE 115-b using the CFRA procedure to initiate the link setup with target SN 210-d. UE 115-b may begin transmitting uplink data to or receiving downlink data from target SN 210-d at 380. In one example, UE 115-b may transmit uplink data to target SN 210-d and target SN 210-d may transmit an ACK to UE 115-b. Once target SN 210-d receives uplink data, the uplink data may be sent to a UPF or a packet data network (PDN) gateway (P-GW) directly. Alternatively, target SN 210-d may transmit the uplink data to target MN 205-d, and target MN 205-d may send the uplink data to the UPF or P-GW. In another example, target SN 210-d may transmit downlink data to UE 115-b. Transmitting the RRC connection reconfiguration complete message and/or communicating data with target SN 210-d may occur while UE 115-a is still performing the random access procedure with target SN 210-d (e.g., before MN_T304 has finished running).

Conventionally, target SN 210-d may wait until target MN 205-d successfully finishes the random access procedure and transmits an SgNB reconfiguration complete message to target SN 210-d in accordance with timer $TXn_{DCoverall}$ before transmitting data to or receiving data from UE 115-b. This procedure may, in the convention case, occur for each MR-DC case. However, in the present example, target SN 210-d may be capable of receiving data and/or transmitting data to UE 115-b as soon as target SN 210-d confirms that UE 115-a has successfully applied the updated DC configuration (e.g., from the RRC connection reconfiguration complete message or from performing the CFRA procedure).

To enable the target SN 210-d to transmit downlink data to or otherwise schedule UE 115-b as soon as the SN connection is set up, which may occur while UE 115-b is still performing the random access procedure with target MN 205-d, the source MN 205-c may perform an SN status transfer at 340 and may forward data received from S-GW at 355 to target MN 205-d at 360. Target MN 205-d may transmit the forwarded data to target SN 210-d at 370. Target SN 210-d may then include at least a portion of the forwarded data at 380. In some cases, target SN 210-d may receive the forwarded data at 370 before target SN 210-d receives RRC connection reconfiguration complete message at 375. In some cases, SN terminated bearers and MN terminated split bearer data transfer may be supported at the target SN 210-d.

Figure 4:
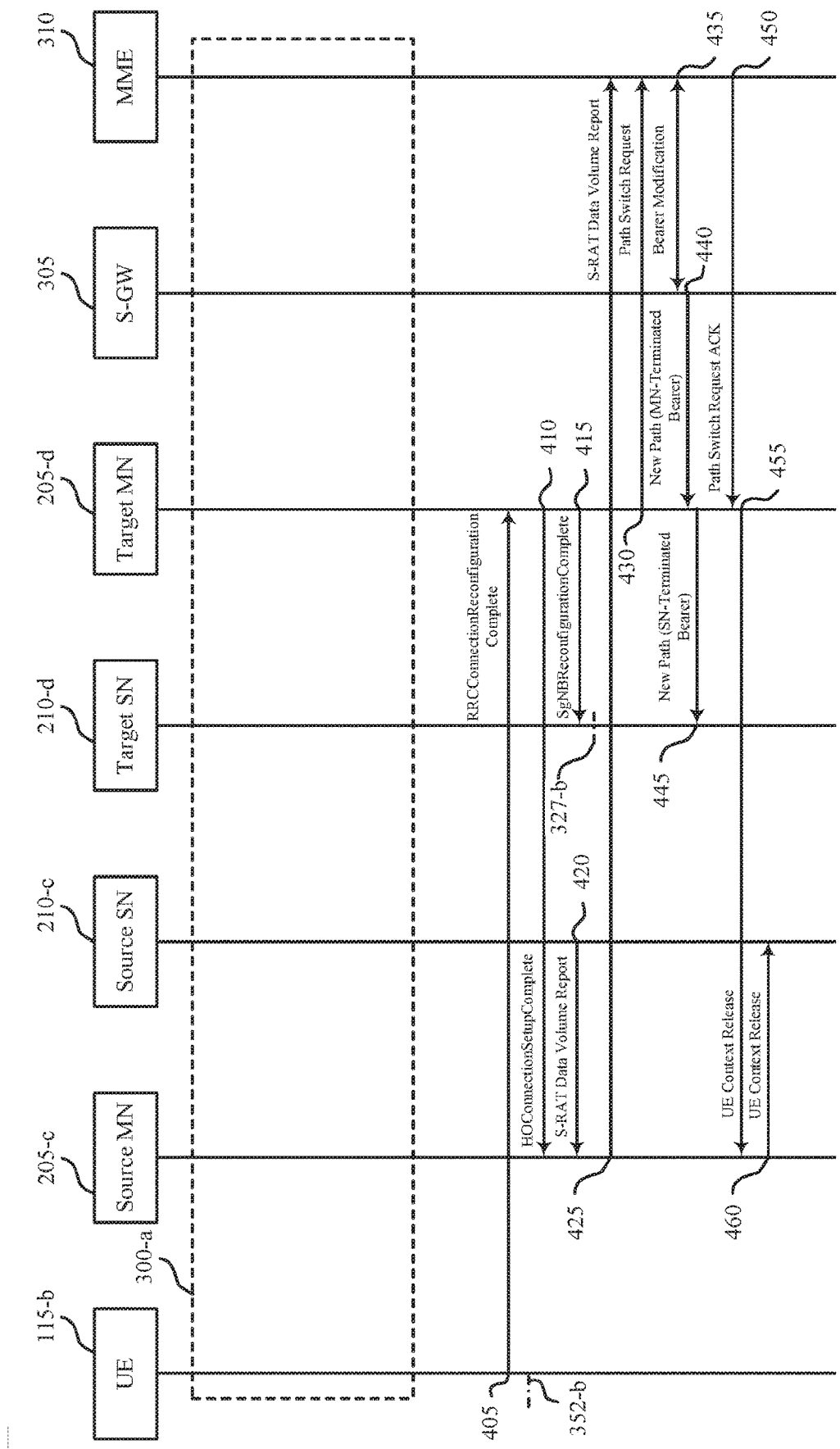
FIG. 4 illustrates an example of an inter-MN call flow that supports parallel handover and failure handling in accordance with aspects of the present disclosure.
Figure 5:
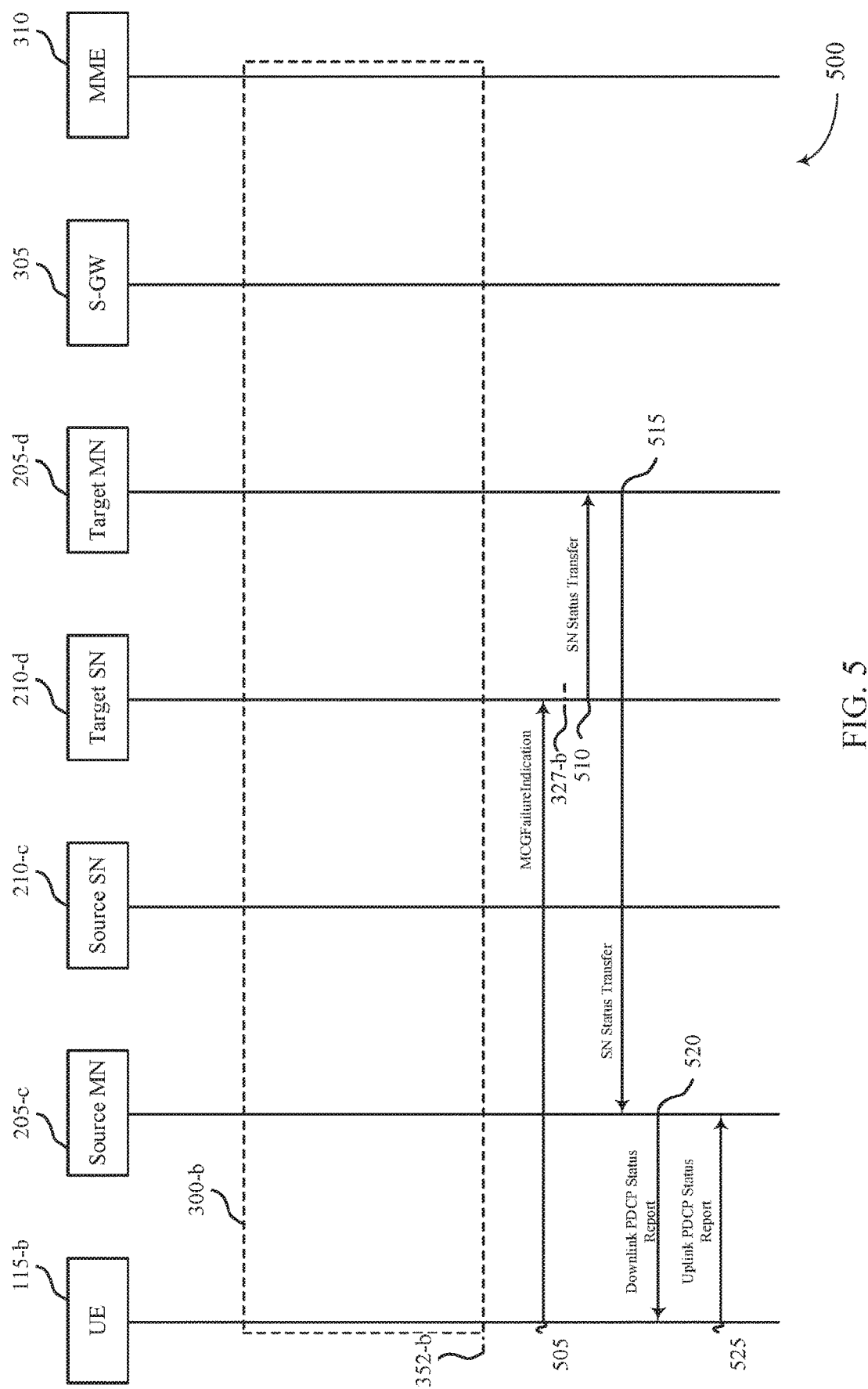
FIG. 5 illustrates an example of an inter-MN call flow that supports parallel handover and failure handling in accordance with aspects of the present disclosure.

FIG. 4 may describe a situation where UE 115-b successfully performs the random access procedure successfully with target MN 205-d and FIG. 5 may describe a situation where UE 115-b fails to perform the random access procedure successfully with target MN 205-d.

FIG. 4 illustrates an example of an inter-MN call flow 400 with an MN-initiated SN change that supports parallel handover and failure handling in accordance with aspects of the present disclosure. Initially, UE 115-b may perform some or each of the steps as described with reference to FIG. 3, indicated by inter-MN call flow 300-a.

Before timer MN_T304 runs out at 352-b, UE 115-b may successfully perform the random access procedure with target MN 205-d. After successfully performing the random access procedure, UE 115-b may transmit, at 405, an RRC connection reconfiguration complete message (e.g., an RRCConnectionReconfigurationComplete message or RRCReconfigurationComplete message) to target MN 205-d.

After receiving the RRC connection reconfiguration complete message, target MN 205-d may transmit, at 410, an indication to source MN 205-c that the handover connection setup is complete (e.g., an HOConnectionSetupComplete message). Additionally or alternatively, target MN 205-d may transmit, at 415, an indication that UE 115-b successfully applied the DC configuration associated with target MN 205-d and target SN 210-d (e.g., an SgNBConfigurationComplete message) to target SN 210-d. Target SN 210-d may receive the indication before the timer $TXn_{DCoverall}$ stops running at 327-b and may determine that the target MN 205-d has successfully performed a random access procedure with UE 115-b based on the indication.

At 420, source SN 210-c may transmit a secondary radio access technology (RAT) data volume report to source MN, 205-c which the source MN 205-c, in turn, may transmit to MME 310 at 425. The secondary RAT data volume report may indicate an amount of data transmitted between UE 115-b and source SN 210-c.

At 430, target MN 205-d may transmit a path switch request to MME 310. After receiving the path switch request, MME 310 may communicate at 435 with S-GW 305 to modify a bearer (e.g., a dedicated bearer). At 440, S-GW 305 may transmit an indication of an MN-terminated bearer to target MN 205-d and, at 445, target MN 205-d may transmit an indication of an SN-terminated bearer to target SN 210-d. At 450, MME 310 may transmit an ACK for the path switch request to target MN 205-d. At 455, target MN 205-d may transmit a UE context release message to source MN 205-c and, at 460, source MN 205-c may transmit the UE context release message to source SN 210-c.

FIG. 5 illustrates an example of an inter-MN call flow 500 with an MN-initiated SN change that supports parallel handover and failure handling in accordance with aspects of the present disclosure. Initially, UE 115-b may perform some or each of the steps as described with reference to FIG. 3, indicated by inter-MN call flow 300-b.

When timer MN_T304 runs out at 352-b, UE 115-b may determine that UE 115-b has failed to successfully perform the random access procedure with target MN 205-d. In such cases, at 505, UE 115-a may transmit an indication of the failure (e.g., MCGFailureIndication) to target SN 210-d. Additionally or alternatively, target SN 210-d may determine, once timer $TXn_{DCoverall}$ runs out at 327-b, that UE 115-b has failed to successfully perform the random access procedure with target MN 205-d (e.g., based on not receiving an SgNBConfigurationComplete from target MN 205-d by this time).

Conventionally, upon failing to setup a link with target MN 205-d, UE 115-b may revert back to a configuration used in source MN 205-c, where the configuration may include state variables and parameters of each radio bearer. Portions of the configuration configured by physicalConfigDedicated, the mac-MainConfig, and the sps-Config may be excluded from being reverted. PDCP entities associated with RLC unacknowledged mode (UM) and SRBs may be reset after a successful RRC connection re-establishment procedure. In EN-DC, the configuration may include a resource block (RB) configuration using NR PDCP, which may be configured by nr-RadioBearerConfig1 and nr-RadioBearerConfig2.

Assuming that UE 115-*b* uses a same dedicated radio bearer (DRB) in the updated configuration and the configuration to which UE 115-*b* is reverting, UE 115-*b* may revert back PDCP states. When reverting back PDCP states, UE 115-*a* may retransmit packets of data (e.g., PDCP service data unit (SDU) packets) already transmitted to and successfully received and decoded by target SN 210-*d* (e.g., where target SN 210-*d* may provide an indication that the packets were successfully received and decoded by transmitting a radio link control (RLC) ACK). UE 115-*a* may do so because source MN 205-*c* may fail to determine that SN 210-*d* has already received those packets. Similarly, even if UE 115-*b* received downlink packets of data (e.g., PDCP packets) from source SN 210-*c*, UE 115-*b* may revert to the old PDCP state and may receive duplicated packets. If the handover releases a DRB, UE 115-*b* may store PDCP packets and add DRB back and if handover adds a new DRB, UE 115-*a* may discard data and release a new DRB.

In one example, UE 115-*b* may successfully set up a link with target SN 210-*d* within 50 ms and may attempt to set up a link with target MN 205-*d* for 10 seconds, which may be a worst case time for timer MN_T304. During the time between when UE 115-*b* successfully setting up the link with target SN 210-*d* and the end of the time for attempting to set up the link with target MN 205-*d*, UE 115-*b* may transmit one or more uplink packets and target SN 210-*d*, in turn, may transmit an ACK. However, assuming that UE 115-*b* fails to set up the link with target MN 205-*d* by the end of the 10 seconds and reverts back to the original configuration, UE 115-*b* may retransmit the one or more uplink packets to the source MN 205-*c*, even though the packets were already successfully received by target SN 210-*d*, as source MN 205-*c* may fail to determine that target SN 210-*d* had already received the packets.

To prevent retransmitting packets that have already been successfully received and decoded, target SN 210-*d* and/or UE 115-*b* may provide an indication of which packets were already successfully received and decoded to source MN 205-*c*. In one example, target SN 210-*d*, at 510, may transmit an SN status transfer message to target MN 205-*d* that includes uplink PDCP status transfer information and/or a downlink sequence number to use for downlink packets (e.g., for PDCP service data units (SDUs)). Target MN 205-*d* may, in turn, transmit the SN status transfer message to source MN 205-*c*. Source MN 205-*c* may use the uplink PDCP status transfer information to construct a downlink PDCP status report. At 520, source MN 205-*c* may transmit the downlink PDCP status report to UE 115-*b*. UE 115-*b*, upon receiving the downlink PDCP status report, may determine which packets were successfully received and decoded by target SN 210-*d* and may refrain from retransmitting those packets. In some cases, the SN status transfer message may include next PDCP sequence number to assign for downlink and/or uplink receiving status.

Additionally or alternatively, at 525, UE 115-*b* may transmit an uplink PDCP status report to source MN 205-*c* that indicates packets from target SN 210-*d* that UE 115-*b* has successfully received and decoded. Source MN 205-*c* may use the report to determine which packets (e.g., which PDCP SDUs) are to be retransmitted to UE 115-*b*, and may avoid retransmitting packets that UE 115-*b* has already successfully received and decoded as indicated by the report. When transmitting packets, source MN 205-*c* may use the downlink sequence number indicated by the SN status transfer message at 515. Additionally, UE 115-*b*, when failing to successfully finish the random access procedure with target MN 205-*d*, may maintain the updated PDCP state (e.g., may not revert to the old PDCP state).

To enable source MN 205-*c* to transmit packets that were not successfully received and decoded by UE 115-*b*, source MN 205-*c* may maintain a buffer. Before or after the source MN 205-*c* forwards data to target MN 205-*d* at 360, source MN 205-*c* may add the forwarded data to a buffer. If, as demonstrated in FIG. 4 at 410, the target MN 205-*d* receives an indication that the handover connection setup is complete, source MN 205-*c* may remove the forwarded data from the buffer. However, as demonstrated in FIG. 5, if source MN 205-*c* receives an SN status transfer message at 515, source MN 205-*c* may remove a first portion of data from the buffer that corresponds to the packets that UE 115-*b* has successfully received and decoded, but may transmit a remaining portion of the data that was not successfully received and decoded to UE 115-*b*. For uplink, any protocol data units (e.g., PDCP packets) received by target MN 205-*d* may be delivered to UPF directly. By maintaining a buffer, source MN 205-*c* may avoid receiving the forwarded data from SN 210-*d* through MN 205-*d*, which may be referred to as reverse data forwarding.

Figure 6:
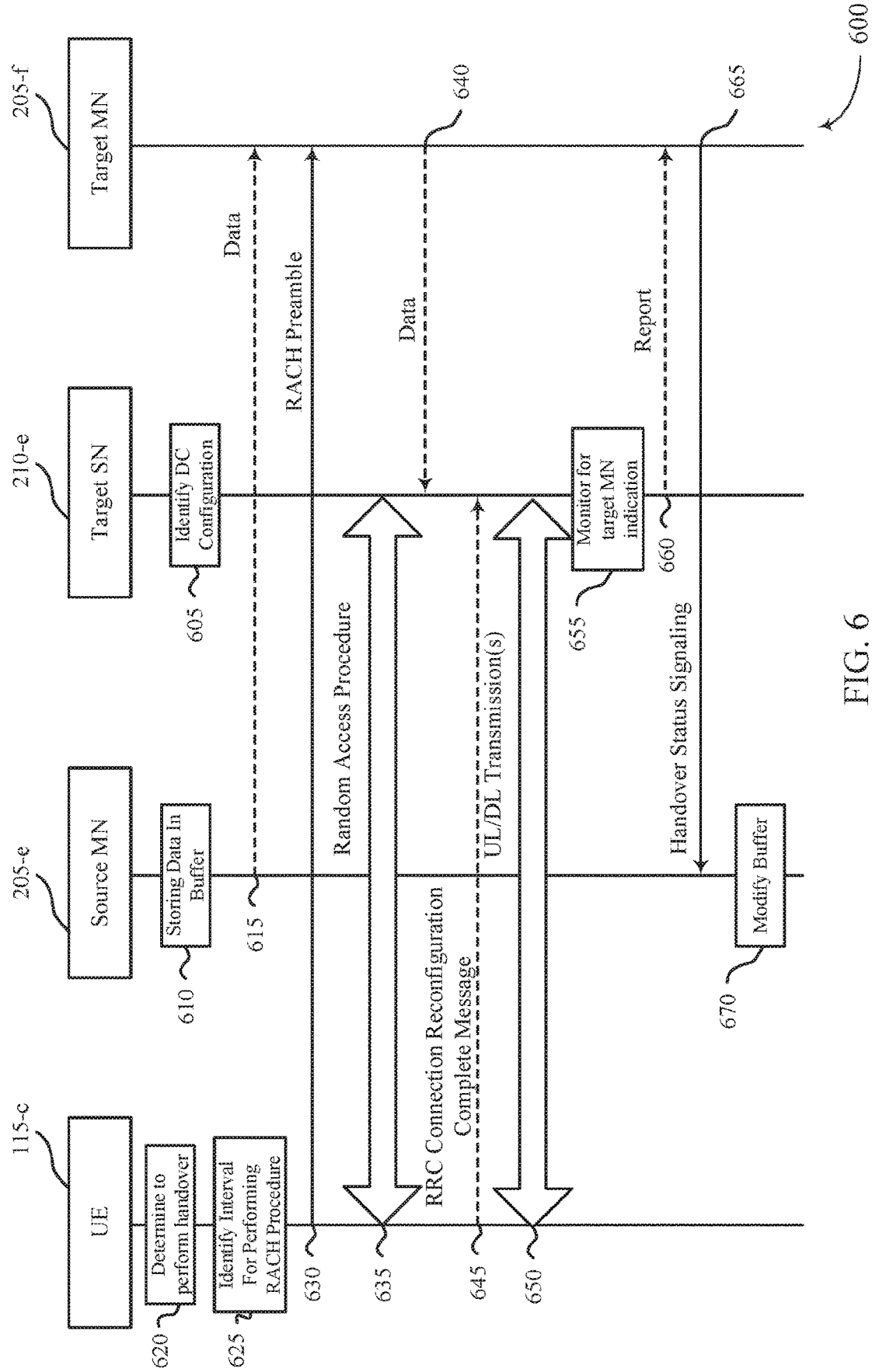
FIG. 6 illustrates an example of a process flow that supports parallel handover and failure handling in accordance with aspects of the present disclosure.

FIG. 6 illustrates an example of a process flow 600 that supports parallel handover and failure handling in accordance with aspects of the present disclosure. In some examples, process flow 600 may implement aspects of wireless communications systems 100 and 200. For instance, UE 115-*c* may be an example of a UE 115 as described with reference to FIG. 1. Additionally, MNs 205-*e* and 205-*f* may be examples of MNs 205 as described with reference to FIG. 2 and SN 210-*e* may be an example of an SN 210 as described with reference to FIG. 2.

At 605, SN 210-*e* may identify a DC configuration. SN 210-*e* may receive an indication of the DC configuration from MN 205-*f*. At 610, MN 205-*f* may store data for UE 115-*c* in a buffer. At 615, MN 205-*f* may transmit the data. MN 205-*f* may receive the data.

At 620, UE 115-*c* may determine to perform handover from MN 205-*e* to MN 205-*f* and from an SN 210 to SN 210-*e*. MN 205-*e* and the SN 210 may be in a first DC configuration and MN 205-*f* and SN 210-*e* may be in a second DC configuration.

At 625, UE 115-*c* may identify a time interval for performing a first random access procedure with MN 205-*f* (e.g., timer MN_T304).

At 630, UE 115-*c* may initiate a first random access procedure with MN 205-*f*. For instance, UE 115-*c* may transmit a random access channel (RACH) preamble to MN 205-*f*. At 635, UE 115-*c* may perform a second random access procedure successfully with SN 210-*e* during the time interval.

At 640, MN 205-*f* may transmit the data to SN 210-*e*.

At 645, UE 115-*c* may transmit, after finishing the second random access procedure, an RRC connection reconfiguration complete message to SN 210-*e*.

At 650, UE 115-*c* may transmit to or receive from SN 210-*e* after performing the second random access procedure successfully and before finishing the random access procedure with MN 205-*f*. For instance, UE 115-*c* may transmit an uplink transmission to SN 210-*e* and SN 210-*e* may transmit an ACK to UE 115-*c* before UE 115-*c* finishes the random access procedure with MN 205-*f*. Additionally or alternatively, SN 210-*e* may transmit at least a portion of the data received from MN 205-*f* to UE 115-*c*.

At 655, SN 210-*e* may monitor for an indication from MN 205-*f* that indicates that UE 115-*c* has successfully applied the DC configuration.

At 660, SN 210-*e* may transmit an indication that one or more packets transmitted by UE 115-*c* have been successfully received and decoded by SN 210-*e*. SN 210-*e* may transmit the indication if SN 210-*e* does not receive the indication from MN 205-*f* that indicates that UE 115-*c* has successfully applied the DC configuration. Additionally or alternatively, SN 210-*e* may transmit the indication if SN 210-*e* receives an indication from UE 115-*c* indicating that the UE 115-*c* did not perform the random access procedure successfully with MN 205-*f*.

At 665, MN 205-*f* may transmit signaling indicating a handover status. If UE 115-*c* performed the random access procedure successfully with MN 205-*f*, the signaling may include a handover success message. Additionally or alternatively, the signaling may include the indication if MN 205-*f* received the indication at 660.

At 670, MN 205-*e* may modify the buffer based on receiving the signaling at 665. For instance, if MN 205-*e* receives the handover success message, MN 205-*e* may remove the data from the buffer. Alternatively, if MN 205-*e* receives the indication that the one or more packets transmitted by UE 115-*c* have been successfully received and decoded by SN 210-*e*, MN 205-*e* may remove the data corresponding to the indicated one or more packets and may transmit the packets corresponding to the remaining data to UE 115-*c*.

Figure 7:
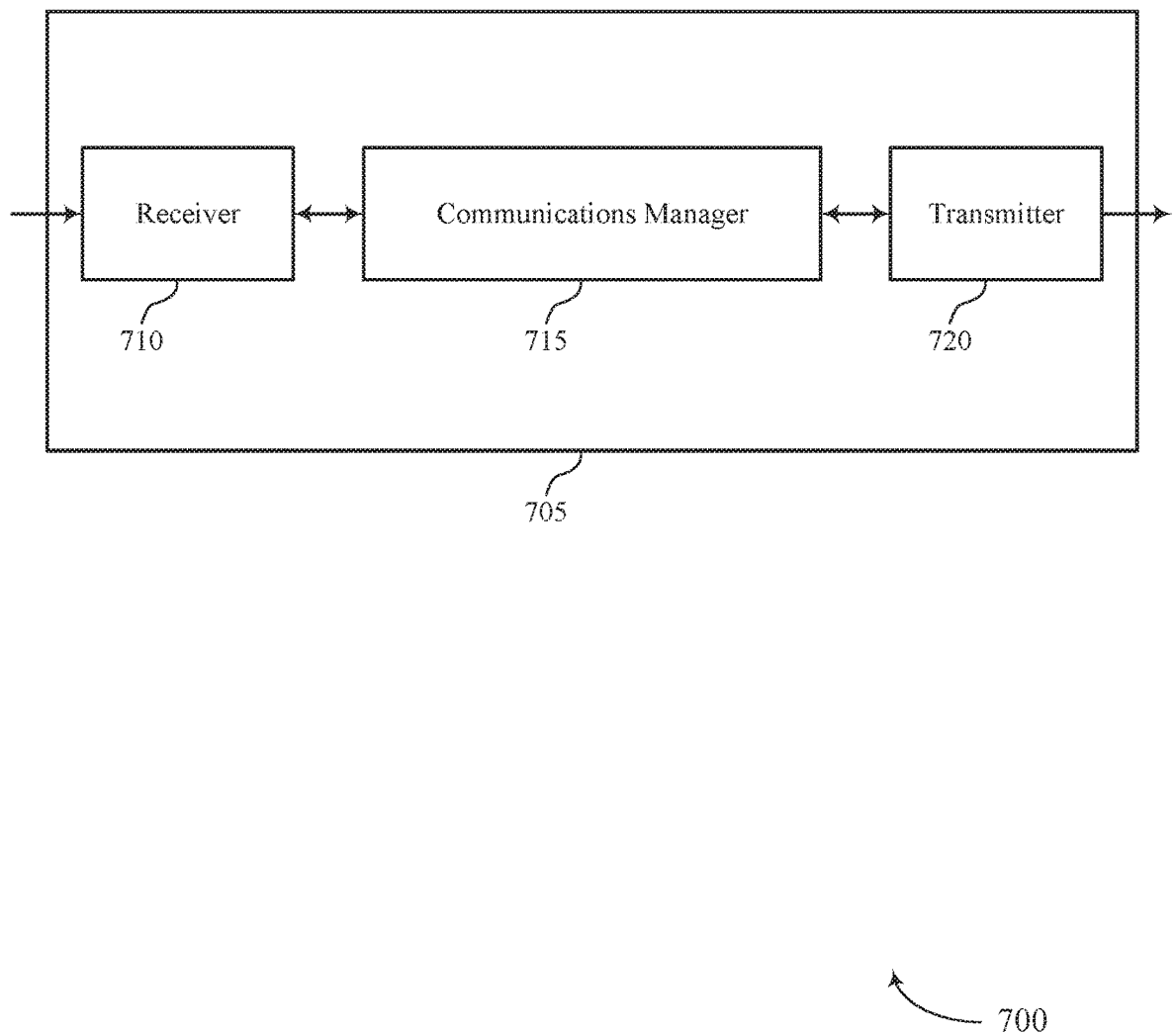
FIGS. 7 and 8 show block diagrams of devices that support parallel handover and failure handling in accordance with aspects of the present disclosure.

FIG. 7 shows a block diagram 700 of a device 705 that supports parallel handover and failure handling in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to parallel handover and failure handling, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may determine to perform a handover from a first source device in a first network to a first target device in the first network and from a second source device in a second network to a second target device in the second network, where the first source device in the first network and the second source device in the second network are in a first dual connectivity configuration and the first target device in the first network and the second target device in the second network are in a second dual connectivity configuration, identify a time interval for performing a first random access procedure with the first target device in the first network, initiate the first random access procedure with the first target device in the first network, perform a second random access procedure successfully with the second target device in the second network during the time interval, and transmit to or receive from the target device in the second network data after performing the second random access procedure successfully and before the UE finishes performing the first random access procedure with the first target device in the first network. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
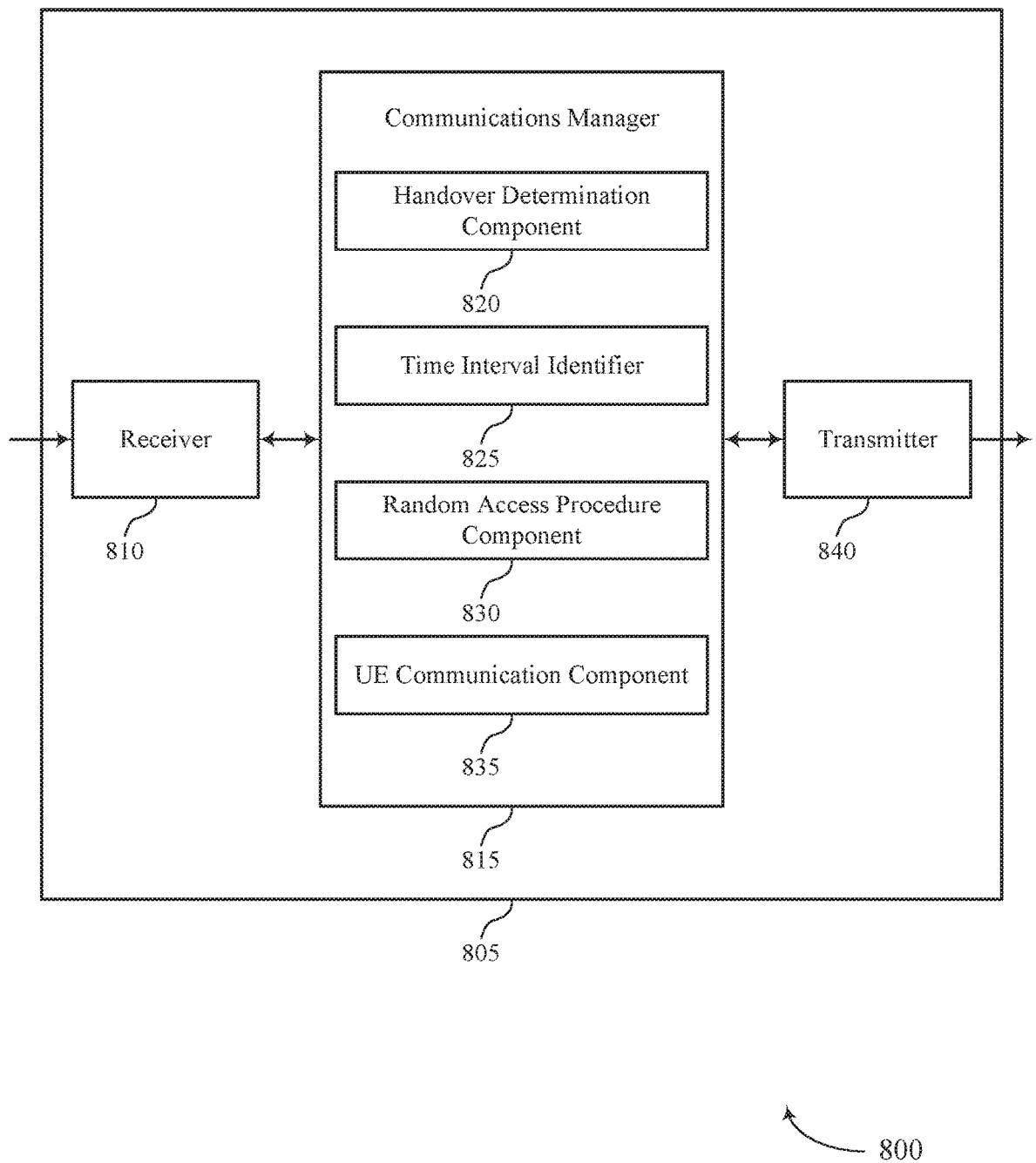

FIG. 8 shows a block diagram 800 of a device 805 that supports parallel handover and failure handling in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to parallel handover and failure handling, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a handover determination component 820, a time interval identifier 825, a random access procedure component 830, and an UE communication component 835. The communications manager 815 may be an example of aspects of the communications manager 1010 described herein.

The handover determination component 820 may determine to perform a handover from a first source device in a first network to a first target device in the first network and from a second source device in a second network to a second target device in the second network, where the first source device in the first network and the second source device in the second network are in a first dual connectivity configuration and the first target device in the first network and the second target device in the second network are in a second dual connectivity configuration.

The time interval identifier 825 may identify a time interval for performing a first random access procedure with the first target device in the first network.

The random access procedure component 830 may initiate the first random access procedure with the first target device in the first network and perform a second random access procedure successfully with the second target device in the second network during the time interval.

The UE communication component 835 may transmit to or receive from the target device in the second network data after performing the second random access procedure successfully and before the UE finishes performing the first random access procedure with the first target device in the first network.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
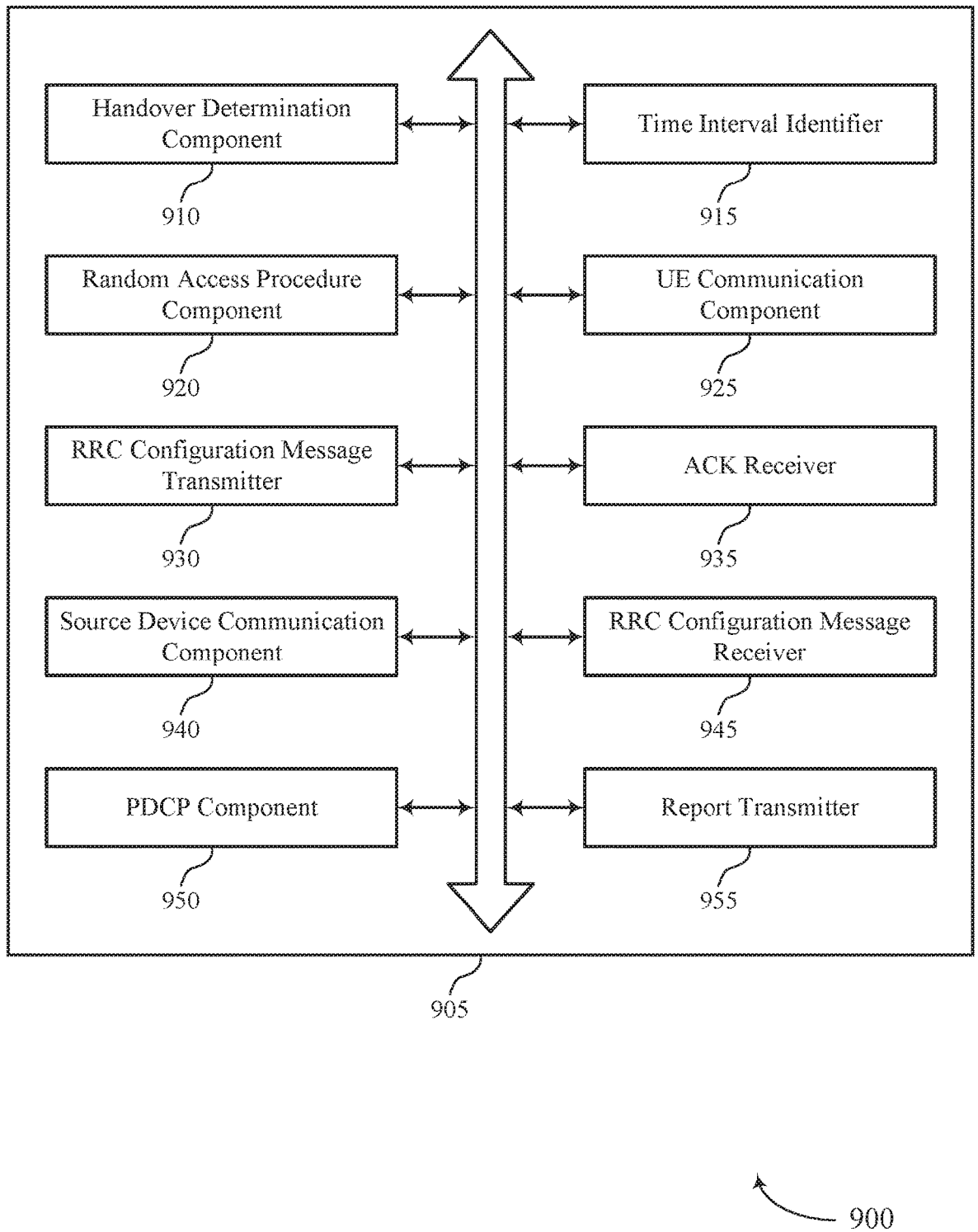
FIG. 9 shows a block diagram of a communications manager that supports parallel handover and failure handling in accordance with aspects of the present disclosure.

FIG. 9 shows a block diagram 900 of a communications manager 905 that supports parallel handover and failure handling in accordance with aspects of the present disclosure. The communications manager 905 may be an example of aspects of a communications manager 715, a communications manager 815, or a communications manager 1010 described herein. The communications manager 905 may include a handover determination component 910, a time interval identifier 915, a random access procedure component 920, an UE communication component 925, a RRC configuration message transmitter 930, an ACK receiver 935, a source device communication component 940, a RRC configuration message receiver 945, a PDCP component 950, and a report transmitter 955. Each of these modules may communicate, directly or indirectly, with one another (e.g., via one or more buses).

The handover determination component 910 may determine to perform a handover from a first source device in a first network to a first target device in the first network and from a second source device in a second network to a second target device in the second network, where the first source device in the first network and the second source device in the second network are in a first dual connectivity configuration and the first target device in the first network and the second target device in the second network are in a second dual connectivity configuration.

In some cases, the first target device in the first network is a master node (MN) and the second target device in the second network is a secondary node (SN).

The time interval identifier 915 may identify a time interval for performing a first random access procedure with the first target device in the first network.

The random access procedure component 920 may initiate the first random access procedure with the first target device in the first network. In some examples, the random access procedure component 920 may perform a second random access procedure successfully with the second target device in the second network during the time interval. In some examples, the random access procedure component 920 may finish the first random access procedure successfully before the end of the time interval. In some examples, the random access procedure component 920 may fail to finish the first random access procedure successfully before an end of the time interval. In some examples, the random access procedure component 920 may transmit, to the second target device in the second network, an indication that the UE has failed to finish the first random access procedure successfully before the end of the time interval.

The UE communication component 925 may transmit to or receive from the target device in the second network data after performing the second random access procedure successfully and before the UE finishes performing the first random access procedure with the first target device in the first network.

The RRC configuration message transmitter 930 may transmit, after finishing the second random access procedure, a radio resource control connection reconfiguration complete message to the second target device in the second network. In some examples, the RRC configuration message transmitter 930 may transmit, after finishing the first random access procedure, a second radio resource control connection reconfiguration complete message to the first target device in the first network.

The ACK receiver 935 may receive an acknowledgement message before the end of the time interval based on transmitting the transmission. In some examples, the ACK receiver 935 may receive the acknowledgement message before finishing the first random access procedure successfully.

The source device communication component 940 may communicate with the first source device in the first network after failing to finish the first random access procedure successfully.

The RRC configuration message receiver 945 may receive a RRC reconnection configuration message.

The PDCP component 950 may update a packet data convergence protocol (PDCP) status of the UE based on the RRC reconnection configuration message. In some examples, the PDCP component 950 may maintain the PDCP status of the UE based on failing to finish the first random access procedure successfully before the end of the time interval. In some cases, PDCP component 950 may receive an indication, from the first source device in the first network, of one or more packets successfully received by the second target device in the second network from the UE.

The report transmitter 955 may transmit a report to the first source device in the first network indicating one or more packets transmitted by the second target device in the second network that have been successfully received and decoded by the UE. In some examples, indicating the one or more packets that have been successfully received and decoded by the second target device in the second network includes providing, for each of the one or more packets, an indication of an associated sequence number. In some examples, the report may be a PDCP status report.

Figure 10:
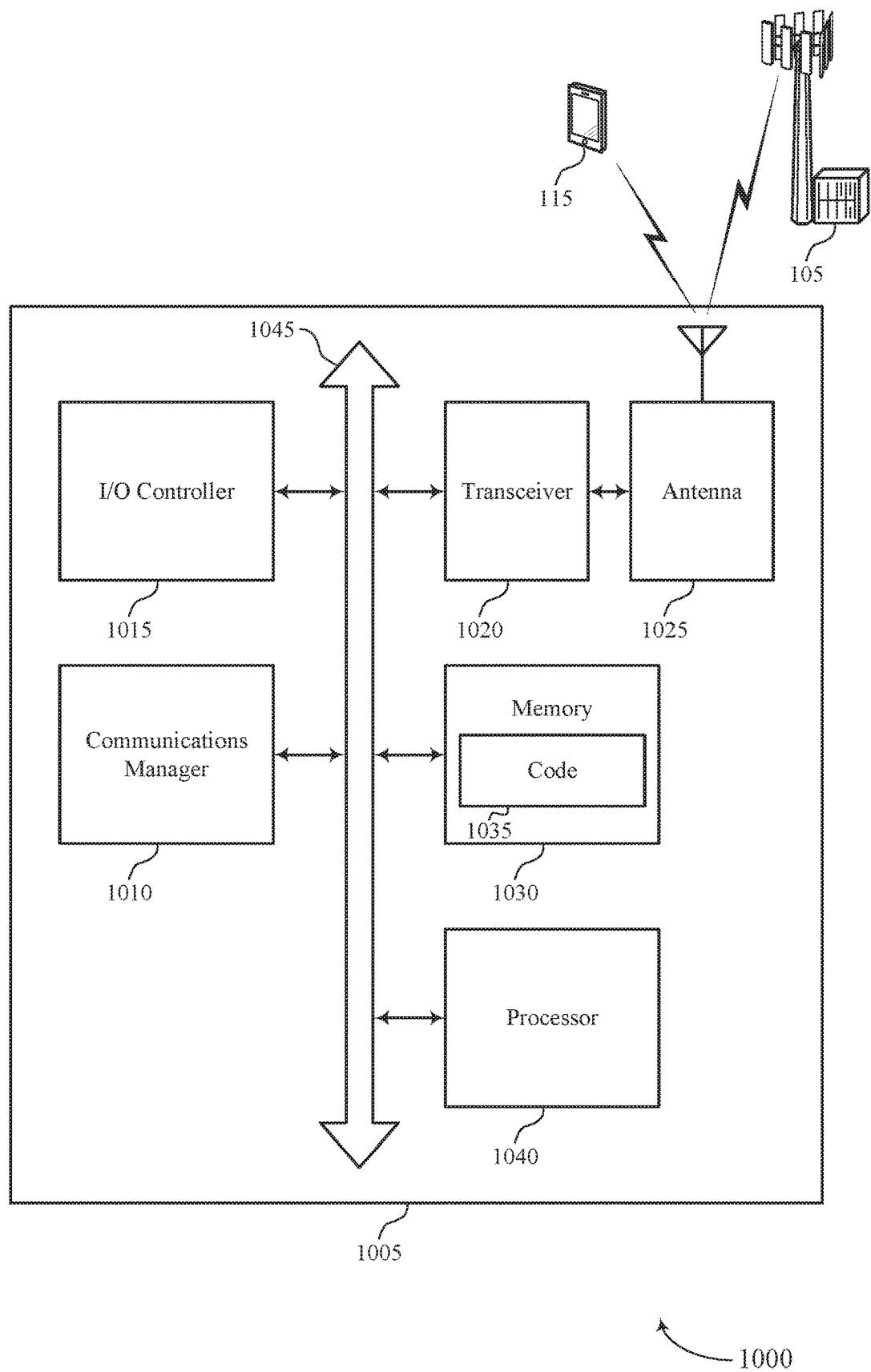
FIG. 10 shows a diagram of a system including a device that supports parallel handover and failure handling in accordance with aspects of the present disclosure.

FIG. 10 shows a diagram of a system 1000 including a device 1005 that supports parallel handover and failure handling in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may determine to perform a handover from a first source device in a first network to a first target device in the first network and from a second source device in a second network to a second target device in the second network, where the first source device in the first network and the second source device in the second network are in a first dual connectivity configuration and the first target device in the first network and the second target device in the second network are in a second dual connectivity configuration, identify a time interval for performing a first random access procedure with the first target device in the first network, initiate the first random access procedure with the first target device in the first network, perform a second random access procedure successfully with the second target device in the second network during the time interval, and transmit to or receive from the target device in the second network data after performing the second random access procedure successfully and before the UE finishes performing the first random access procedure with the first target device in the first network.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting parallel handover and failure handling).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
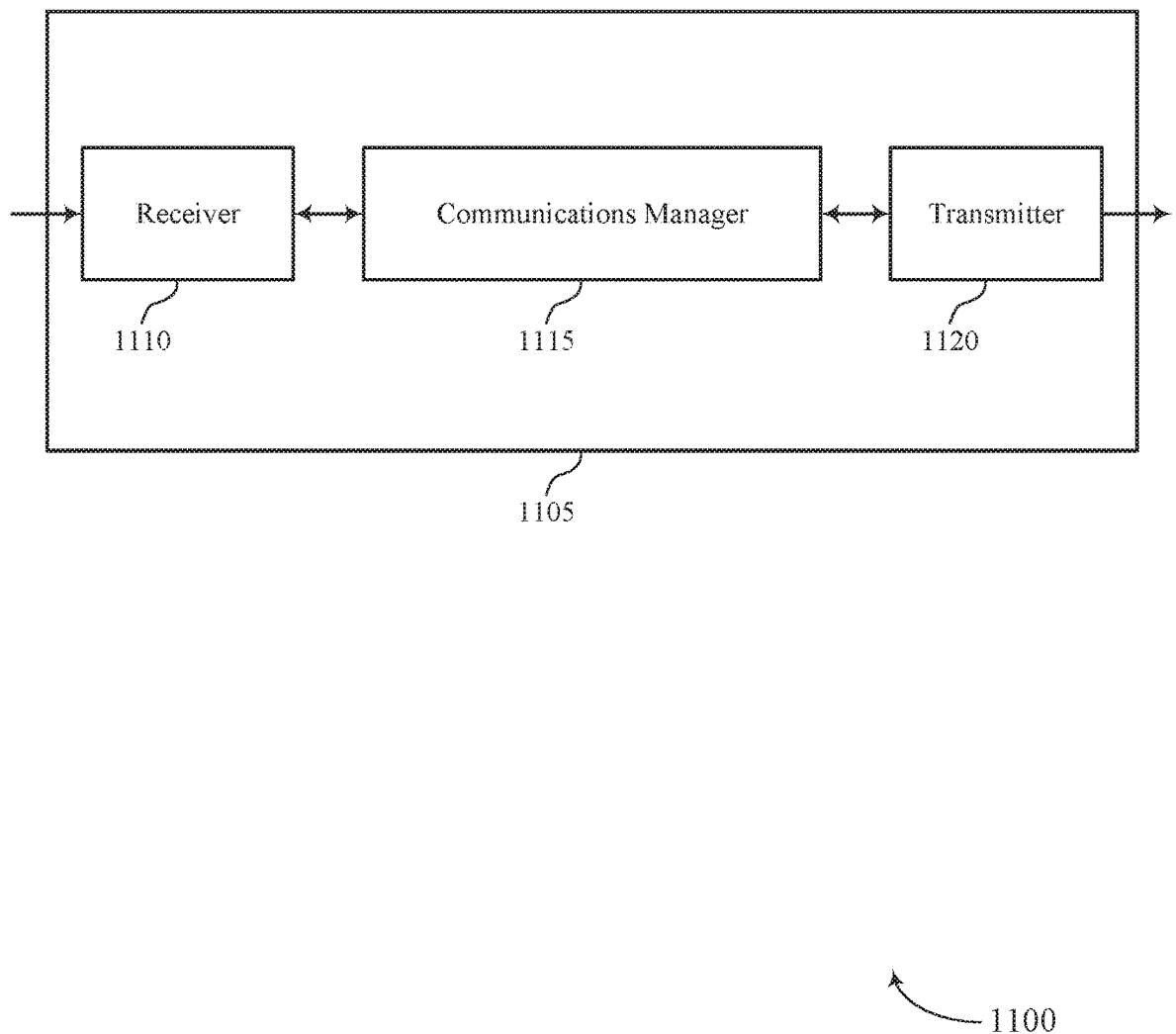
FIGS. 11 and 12 show block diagrams of devices that support parallel handover and failure handling in accordance with aspects of the present disclosure.

FIG. 11 shows a block diagram 1100 of a device 1105 that supports parallel handover and failure handling in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to parallel handover and failure handling, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a dual connectivity (DC) configuration for the first target device in the first network, perform a random access procedure successfully with a UE, receive an uplink transmission from the UE or transmitting a downlink transmission to the UE based on performing the random access procedure successfully, and monitor for an indication, from a second target device in a second network and after receiving the uplink transmission or transmitting the downlink transmission, that the UE has successfully applied the DC configuration. The communications manager 1115 may also receive data from a first source device in the first network, transmit the data to a second target device in a second network, receive, from the second target device in the second network, an indication that one or more packets transmitted by a UE have been successfully received and decoded by the second target device in the second network, and transmit the indication to the first source device in the first network. The communications manager 1115 may also store data for a UE in a buffer, modify the buffer based on receiving the signaling indicating the handover status, transmit the data to a first target device in the first network, and receive signaling indicating a handover status from the first target device in the first network. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
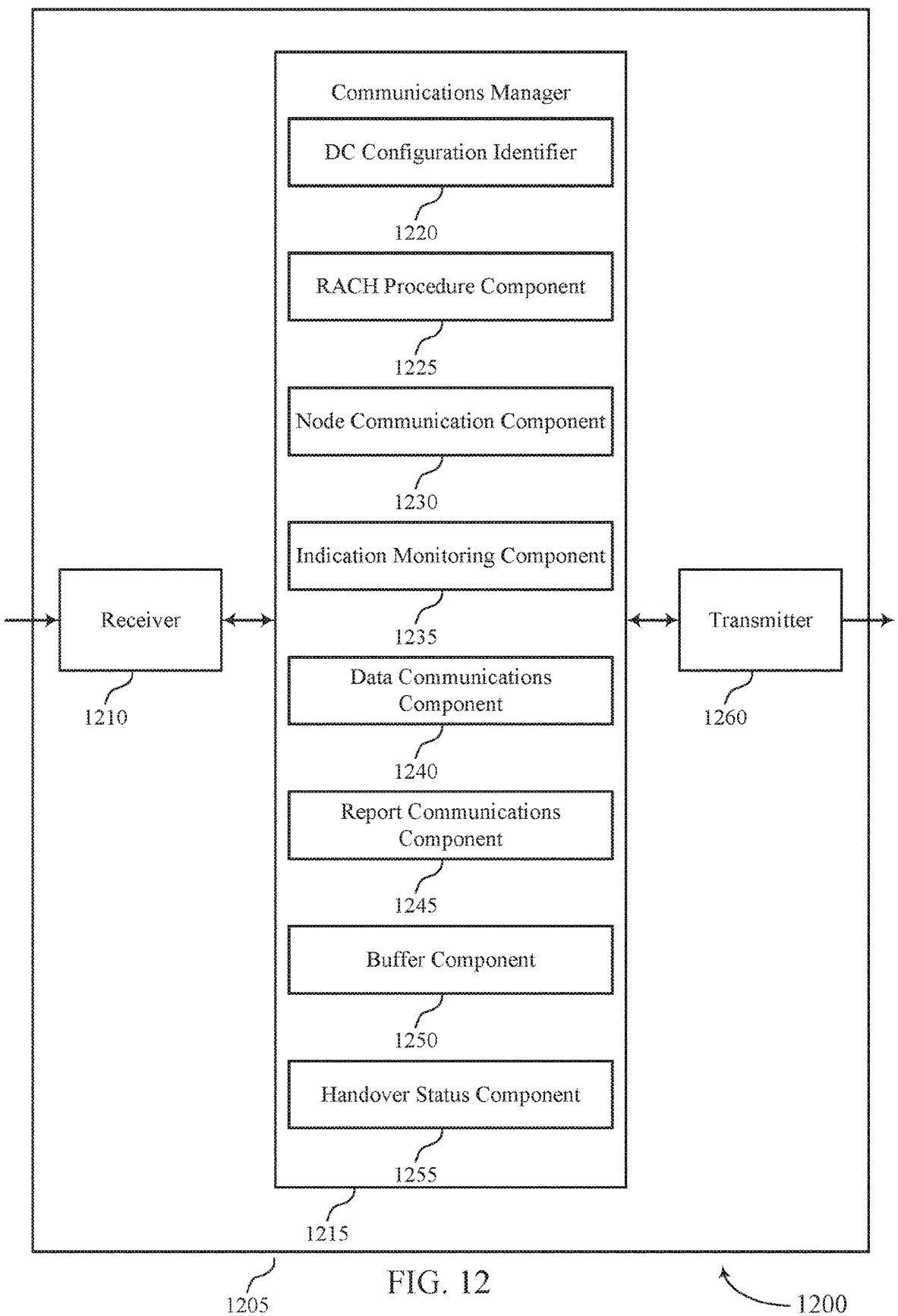

FIG. 12 shows a block diagram 1200 of a device 1205 that supports parallel handover and failure handling in accordance with aspects of the present disclosure. The device 1205 may be an example of aspects of a device 1105, a base station 105, an MN 205, or an SN 210 as described herein. The device 1205 may include a receiver 1210, a communications manager 1215, and a transmitter 1260. The device 1205 may also include a processor. Each of these components may be in communication with one another (e.g., via one or more buses).

The receiver 1210 may receive information such as packets, user data, or control information associated with various information channels (e.g., control channels, data channels, and information related to parallel handover and failure handling, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a DC configuration identifier 1220, a RACH procedure component 1225, a node communication component 1230, an indication monitoring component 1235, a data communications component 1240, a report communications component 1245, a buffer component 1250, and a handover status component 1255. The communications manager 1215 may be an example of aspects of the communications manager 1410 described herein.

The DC configuration identifier 1220 may identify a dual connectivity (DC) configuration for the first target device in the first network.

The RACH procedure component 1225 may perform a random access procedure successfully with a UE.

The node communication component 1230 may receive an uplink transmission from the UE or transmitting a downlink transmission to the UE based on performing the random access procedure successfully.

The indication monitoring component 1235 may monitor for an indication, from a second target device in a second network and after receiving the uplink transmission or transmitting the downlink transmission, that the UE has successfully applied the DC configuration.

The data communications component 1240 may receive data from a first source device in the first network and transmit the data to a second target device in a second network. The data communications component 1240 may transmit the data to a first target device in the first network.

The report communications component 1245 may receive, from the second target device in the second network, an indication that one or more packets transmitted by a UE have been successfully received and decoded by the second target device in the second network and transmit the indication to the first source device in the first network. In some cases, report communications component 1245 may receive an indication of a downlink sequence number with the indication of the one or more packets.

The buffer component 1250 may store data for a UE in a buffer and modify the buffer based on receiving the signaling indicating the handover status.

The handover status component 1255 may receive signaling indicating a handover status from the first target device in the first network.

The transmitter 1260 may transmit signals generated by other components of the device 1205. In some examples, the transmitter 1260 may be collocated with a receiver 1210 in a transceiver module. For example, the transmitter 1260 may be an example of aspects of the transceiver 1420 described with reference to FIG. 14. The transmitter 1260 may utilize a single antenna or a set of antennas.

Figure 13:
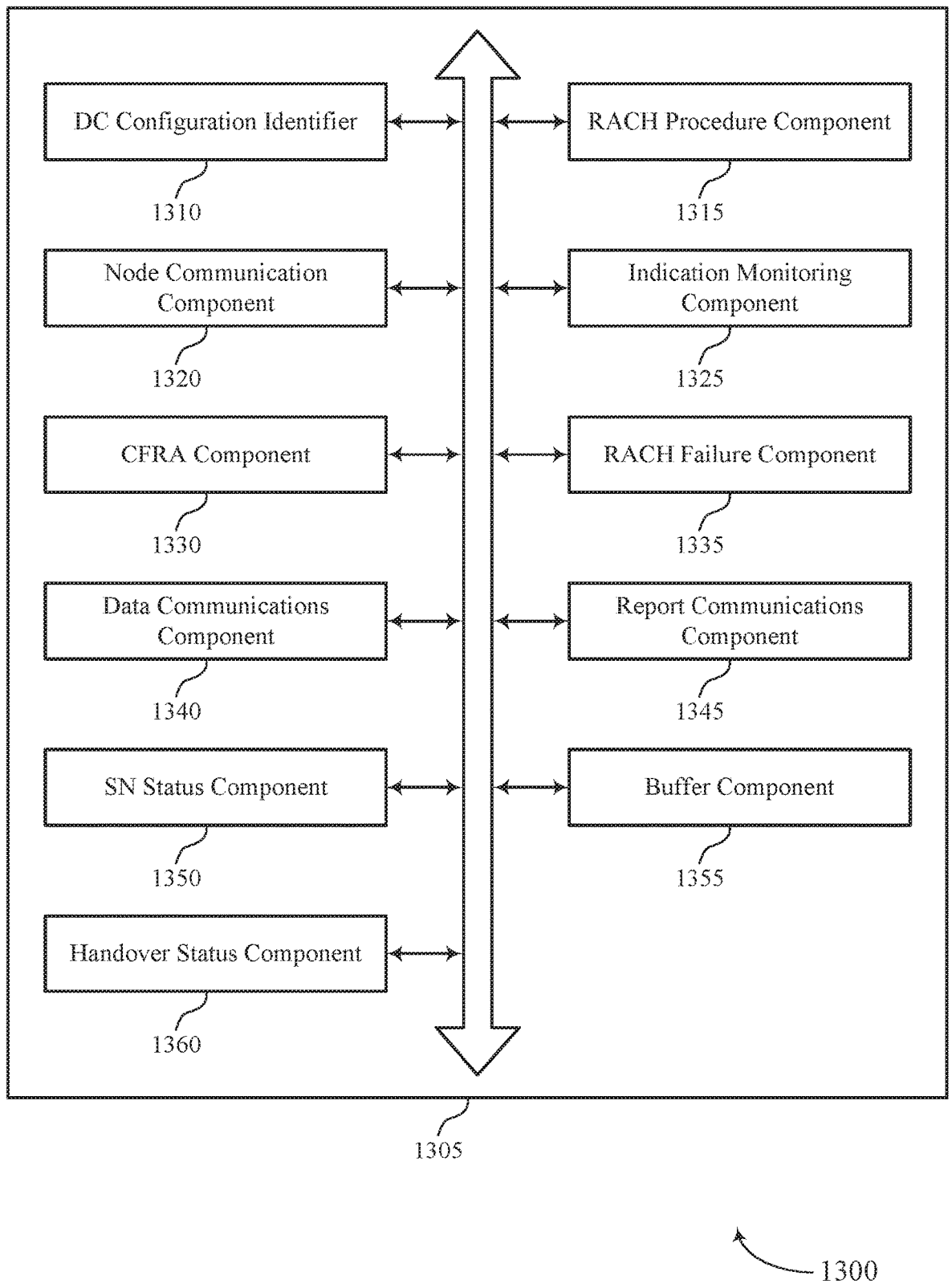
FIG. 13 shows a block diagram of a communications manager that supports parallel handover and failure handling in accordance with aspects of the present disclosure.

FIG. 13 shows a block diagram 1300 of a communications manager 1305 that supports parallel handover and failure handling in accordance with aspects of the present disclosure. The communications manager 1305 may be an example of aspects of a communications manager 1115, a communications manager 1215, or a communications manager 1410 described herein. The communications manager 1305 may include a DC configuration identifier 1310, a RACH procedure component 1315, a node communication component 1320, an indication monitoring component 1325, a CFRA component 1330, a RACH failure component 1335, a data communications component 1340, a report communications component 1345, a SN status component 1350, a buffer component 1355, and a handover status component 1360. Each of these modules may communicate, directly or indirectly, with one another (e.g., via one or more buses).

The DC configuration identifier 1310 may identify a dual connectivity (DC) configuration for the first target device in the first network. In some examples, the DC configuration identifier 1310 may receive, from the second target device in the second network, the DC configuration.

The RACH procedure component 1315 may perform a random access procedure successfully with a UE.

The node communication component 1320 may receive an uplink transmission from the UE or transmitting a downlink transmission to the UE based on performing the random access procedure successfully. In some examples, the node communication component 1320 may transmit, to the UE, an acknowledgment message for the uplink transmission before receiving the indication that the UE has successfully applied the DC configuration. In some examples, receiving data from the second target device in the second network, where the downlink transmission includes at least a portion of the data. In some examples, the node communication component 1320 may receive the uplink transmission or transmitting the downlink transmission during the time interval.

The indication monitoring component 1325 may monitor for an indication, from a second target device in a second network and after receiving the uplink transmission or transmitting the downlink transmission, that the UE has successfully applied the DC configuration. In some examples, the indication monitoring component 1325 may receive a second indication, from the UE and after performing the random access procedure successfully, that the UE has successfully applied the DC configuration. In some examples, the indication monitoring component 1325 may identify, based on receiving the DC configuration, a time interval for receiving the indication that the UE has successfully applied the DC configuration. In some cases, the first target device in the first network is a secondary node (SN) and the second target device in the second network is a master node (MN).

The CFRA component 1330 may determine that the random access procedure is a contention-free random access (CFRA) procedure.

In some examples, the CFRA component 1330 may determine that the UE has successfully applied the DC configuration based on determining that the random access procedure is the CFRA procedure.

The RACH failure component 1335 may receive, from the UE, an indication that the UE has failed to finish the first random access procedure successfully before an end of a time interval.

In some examples, the RACH failure component 1335 may transmit, to the second target device in the second network, an indication of one or more packets transmitted by the first target device in the first network that have been successfully received and decoded by the UE. In some examples, the RACH failure component 1335 may transmit, to the second target device in the second network, an indication of a downlink sequence number with the indication of the one or more packets.

In some examples, the RACH failure component 1335 may fail, by an end of the time interval, to receive the indication that the UE has successfully applied the DC configuration.

In some cases, the indicating the one or more packets that have been successfully received and decoded by the first target device in the first network includes providing, for each of the one or more packets, an indication of an associated sequence number.

The data communications component 1340 may receive data from a first source device in the first network. In some examples, the data communications component 1340 may transmit the data to a second target device in a second network. In some examples, the data communications component 1340 may transmit the data to a first target device in the first network. In some examples, the data communications component 1340 may transmit one or more downlink transmissions to the UE that include a second portion of the data unassociated with the one or more packets. In some examples, the data communications component 1340 may transmit a downlink transmission to the UE or receiving an uplink transmission from the UE based on the updated PDCP status. In some cases, the target device in the first network is a master node (MN) and the second target device in the second network is a secondary node (SN).

The report communications component 1345 may receive, from the second target device in the second network, an indication that one or more packets transmitted by a UE have been successfully received and decoded by the second target device in the second network. In some examples, the report communications component 1345 may transmit the indication to the first source device in the first network. In some examples, indicating that the one or more packets have been successfully received and decoded by the UE includes providing, for each of the one or more packets, an indication of an associated sequence number. In some cases, the indication is received based on the first target device in the first network failing to perform a random access procedure successfully with the UE. In some cases, the report communications component 1345 may receive, from the UE, a report indicating one or more packets transmitted by a second target device in a second network that have been successfully received and decoded by the UE.

The SN status component 1350 may receive, from the first source device in the first network, a status of a second source device in the second network, where receiving the indication that the one or more packets have been successfully received and decoded by the UE is based on receiving the status of the second source device in the second network.

The buffer component 1355 may store data for a UE in a buffer. In some examples, the buffer component 1355 may modify the buffer based on receiving the signaling indicating the handover status. In some examples, the buffer component 1355 may remove the data from the buffer. In some examples, the buffer component 1355 may remove at least a portion of the data corresponding to the one or more packets from the buffer.

The handover status component 1360 may receive signaling indicating a handover status from the first target device in the first network. In some examples, the handover status component 1360 may receive, from the first target device in the first network, a PDCP status of a second target device in a second network. In some examples, the handover status component 1360 may update the PDCP status of the first source device in the first network based on receiving the PDCP status. In some cases, the signaling includes an indication that one or more packets transmitted by the second target device in the second network have been successfully received and decoded by the UE.

Figure 14:
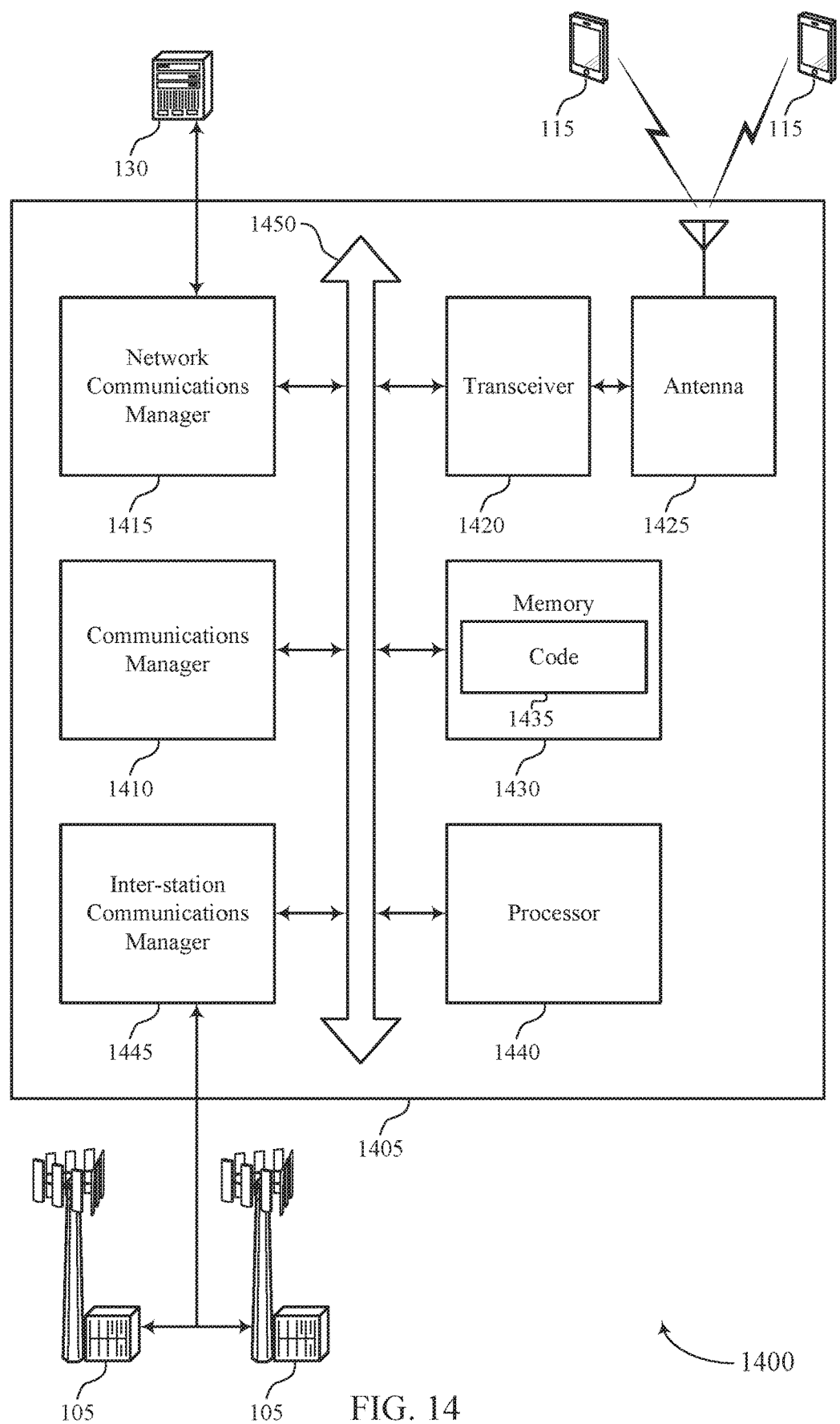
FIG. 14 shows a diagram of a system including a device that supports parallel handover and failure handling in accordance with aspects of the present disclosure.

FIG. 14 shows a diagram of a system 1400 including a device 1405 that supports parallel handover and failure handling in accordance with aspects of the present disclosure. The device 1405 may be an example of or include the components of device 1105, device 1205, a base station 105, an MN 205, or an SN 210 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a dual connectivity (DC) configuration for the first target device in the first network, perform a random access procedure successfully with a UE, receive an uplink transmission from the UE or transmitting a downlink transmission to the UE based on performing the random access procedure successfully, and monitor for an indication, from a second target device in a second network and after receiving the uplink transmission or transmitting the downlink transmission, that the UE has successfully applied the DC configuration. The communications manager 1410 may also receive data from a first source device in the first network, transmit the data to a second target device in a second network, receive, from the second target device in the second network, an indication that one or more packets transmitted by the second target device in the second network have been successfully received and decoded by a UE, and transmit the indication to the first source device in the first network. The communications manager 1410 may also store data for a UE in a buffer, modify the buffer based on receiving the signaling indicating the handover status, transmit the data to a first target device in the first network, and receive signaling indicating a handover status from the first target device in the first network.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting parallel handover and failure handling).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
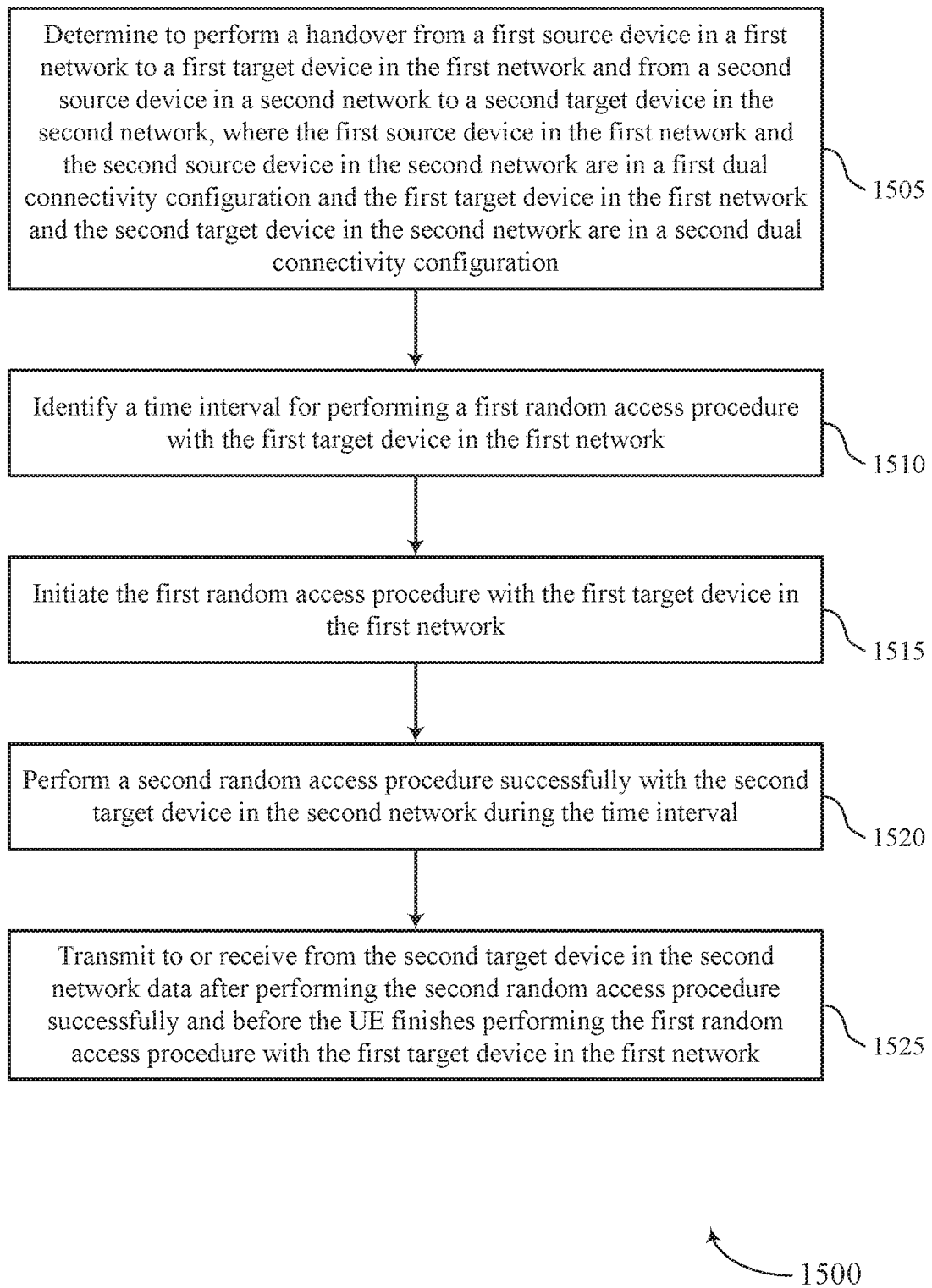
FIGS. 15 through 19 show flowcharts illustrating methods that support parallel handover and failure handling in accordance with aspects of the present disclosure.

FIG. 15 shows a flowchart illustrating a method 1500 that supports parallel handover and failure handling in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may determine to perform a handover from a first source device in a first network to a first target device in the first network and from a second source device in a second network to a second target device in the second network, where the first source device in the first network and the second source device in the second network are in a first dual connectivity configuration and the first target device in the first network and the second target device in the second network are in a second dual connectivity configuration. The operations of 1505 may be performed according to the methods described herein. In some examples, aspects of the operations of 1505 may be performed by a handover determination component as described with reference to FIGS. 7 through 10.

At 1510, the UE may identify a time interval for performing a first random access procedure with the first target device in the first network. The operations of 1510 may be performed according to the methods described herein. In some examples, aspects of the operations of 1510 may be performed by a time interval identifier as described with reference to FIGS. 7 through 10.

At 1515, the UE may initiate the first random access procedure with the first target device in the first network. The operations of 1515 may be performed according to the methods described herein. In some examples, aspects of the operations of 1515 may be performed by a random access procedure component as described with reference to FIGS. 7 through 10.

At 1520, the UE may perform a second random access procedure successfully with the second target device in the second network during the time interval. The operations of 1520 may be performed according to the methods described herein. In some examples, aspects of the operations of 1520 may be performed by a random access procedure component as described with reference to FIGS. 7 through 10.

At 1525, the UE may transmit to or receive from the target device in the second network data after performing the second random access procedure successfully and before the UE finishes performing the first random access procedure with the first target device in the first network. The operations of 1525 may be performed according to the methods described herein. In some examples, aspects of the operations of 1525 may be performed by an UE communication component as described with reference to FIGS. 7 through 10.

Figure 16:
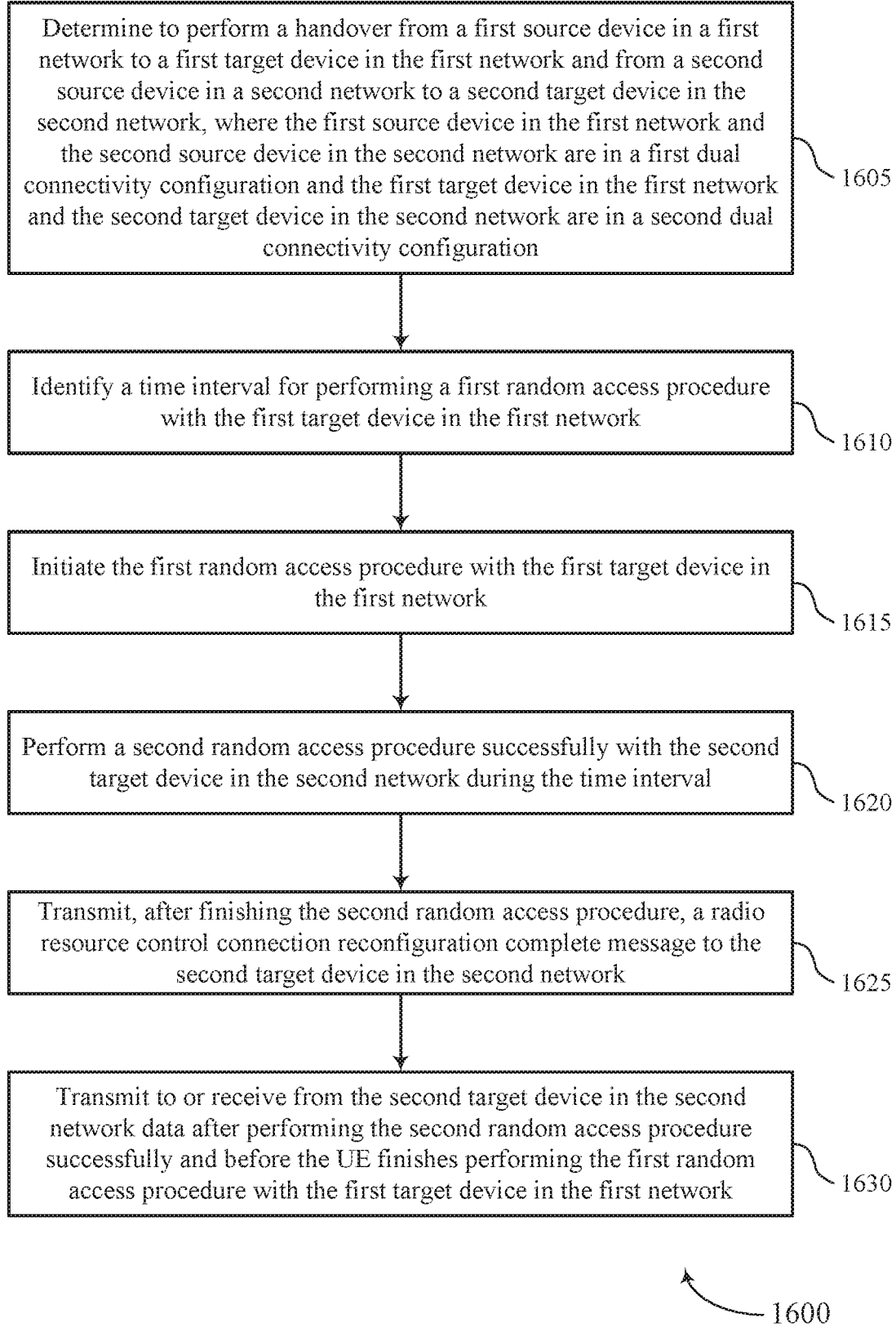

FIG. 16 shows a flowchart illustrating a method 1600 that supports parallel handover and failure handling in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may determine to perform a handover from a first source device in a first network to a first target device in the first network and from a second source device in a second network to a second target device in the second network, where the first source device in the first network and the second source device in the second network are in a first dual connectivity configuration and the first target device in the first network and the second target device in the second network are in a second dual connectivity configuration. The operations of 1605 may be performed according to the methods described herein. In some examples, aspects of the operations of 1605 may be performed by a handover determination component as described with reference to FIGS. 7 through 10.

At 1610, the UE may identify a time interval for performing a first random access procedure with the first target device in the first network. The operations of 1610 may be performed according to the methods described herein. In some examples, aspects of the operations of 1610 may be performed by a time interval identifier as described with reference to FIGS. 7 through 10.

At 1615, the UE may initiate the first random access procedure with the first target device in the first network. The operations of 1615 may be performed according to the methods described herein. In some examples, aspects of the operations of 1615 may be performed by a random access procedure component as described with reference to FIGS. 7 through 10.

At 1620, the UE may perform a second random access procedure successfully with the second target device in the second network during the time interval. The operations of 1620 may be performed according to the methods described herein. In some examples, aspects of the operations of 1620 may be performed by a random access procedure component as described with reference to FIGS. 7 through 10.

At 1625, the UE may transmit, after finishing the second random access procedure, a radio resource control connection reconfiguration complete message to the second target device in the second network. The operations of 1625 may be performed according to the methods described herein. In some examples, aspects of the operations of 1625 may be performed by a RRC configuration message transmitter as described with reference to FIGS. 7 through 10.

At 1630, the UE may transmit to or receive from the target device in the second network data after performing the second random access procedure successfully and before the UE finishes performing the first random access procedure with the first target device in the first network. The operations of 1630 may be performed according to the methods described herein. In some examples, aspects of the operations of 1630 may be performed by an UE communication component as described with reference to FIGS. 7 through 10.

Figure 17:
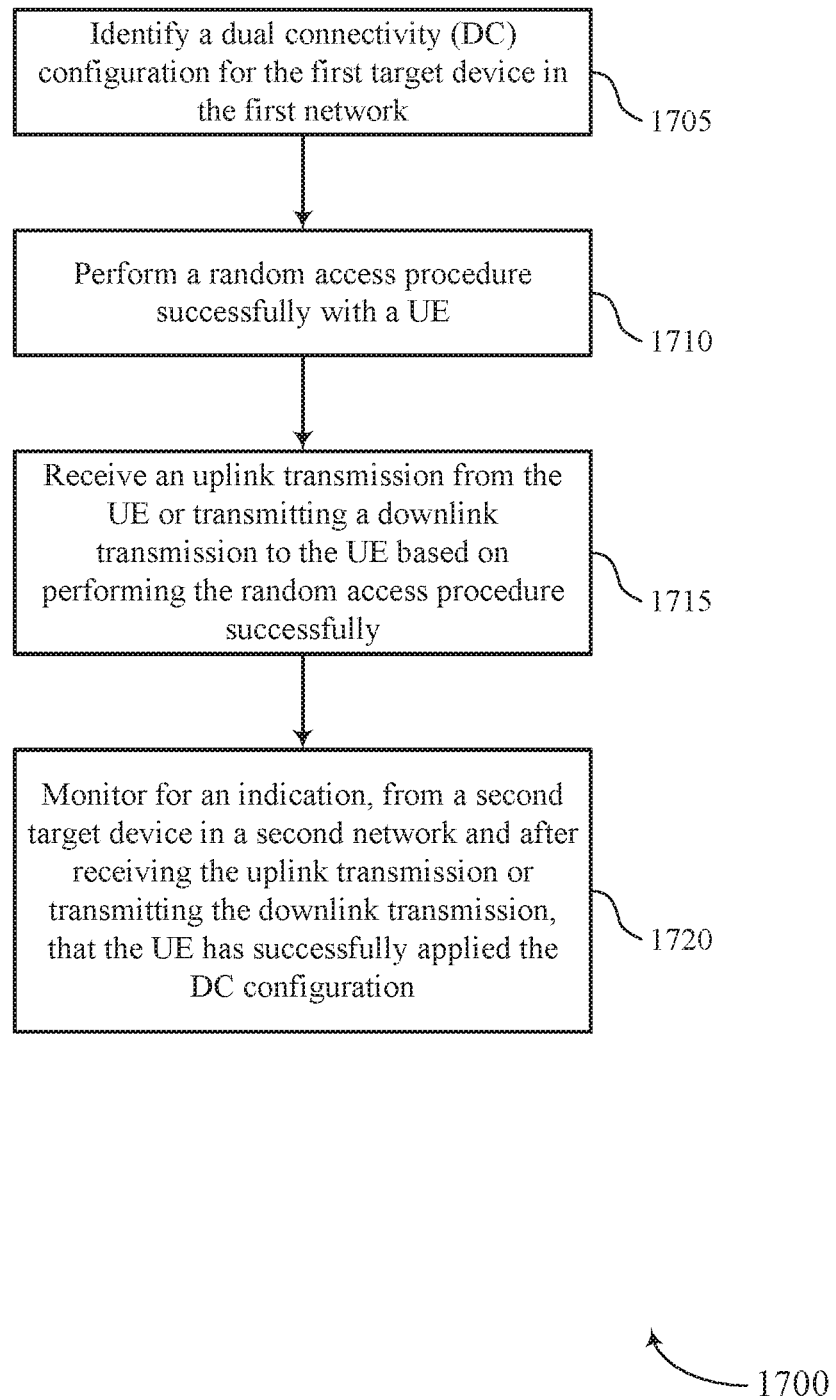

FIG. 17 shows a flowchart illustrating a method 1700 that supports parallel handover and failure handling in accordance with aspects of the present disclosure. The operations of method 1700 may be implemented by a base station 105, an MN 205, an SN 210 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may identify a dual connectivity (DC) configuration for the first target device in the first network. The operations of 1705 may be performed according to the methods described herein. In some examples, aspects of the operations of 1705 may be performed by a DC configuration identifier as described with reference to FIGS. 11 through 14.

At 1710, the base station may perform a random access procedure successfully with a UE. The operations of 1710 may be performed according to the methods described herein. In some examples, aspects of the operations of 1710 may be performed by a RACH procedure component as described with reference to FIGS. 11 through 14.

At 1715, the base station may receive an uplink transmission from the UE or transmitting a downlink transmission to the UE based on performing the random access procedure successfully. The operations of 1715 may be performed according to the methods described herein. In some examples, aspects of the operations of 1715 may be performed by a node communication component as described with reference to FIGS. 11 through 14.

At 1720, the base station may monitor for an indication, from a second target device in a second network and after receiving the uplink transmission or transmitting the downlink transmission, that the UE has successfully applied the DC configuration. The operations of 1720 may be performed according to the methods described herein. In some examples, aspects of the operations of 1720 may be performed by an indication monitoring component as described with reference to FIGS. 11 through 14.

Figure 18:
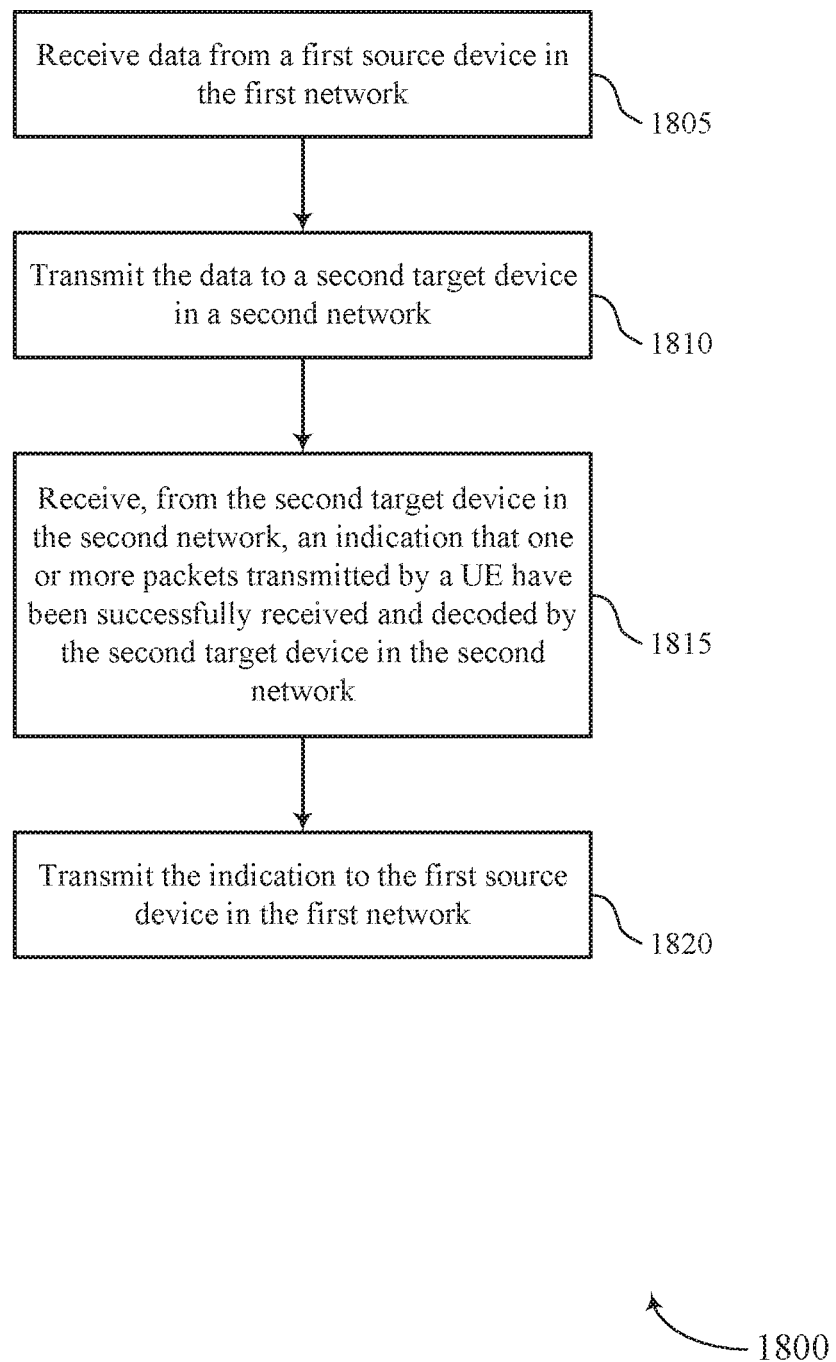

FIG. 18 shows a flowchart illustrating a method 1800 that supports parallel handover and failure handling in accordance with aspects of the present disclosure. The operations of method 1800 may be implemented by a base station 105, an MN 205, an SN 210, or their components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may receive data from a first source device in the first network. The operations of 1805 may be performed according to the methods described herein. In some examples, aspects of the operations of 1805 may be performed by a data communications component as described with reference to FIGS. 11 through 14.

At 1810, the base station may transmit the data to a second target device in a second network. The operations of 1810 may be performed according to the methods described herein. In some examples, aspects of the operations of 1810 may be performed by a data communications component as described with reference to FIGS. 11 through 14.

At 1815, the base station may receive, from the second target device in the second network, an indication that one or more packets transmitted by a UE have been successfully received and decoded by the second target device in the second network. The operations of 1815 may be performed according to the methods described herein. In some examples, aspects of the operations of 1815 may be performed by a report communications component as described with reference to FIGS. 11 through 14.

At 1820, the base station may transmit the indication to the first source device in the first network. The operations of 1820 may be performed according to the methods described herein. In some examples, aspects of the operations of 1820 may be performed by a report communications component as described with reference to FIGS. 11 through 14.

Figure 19:
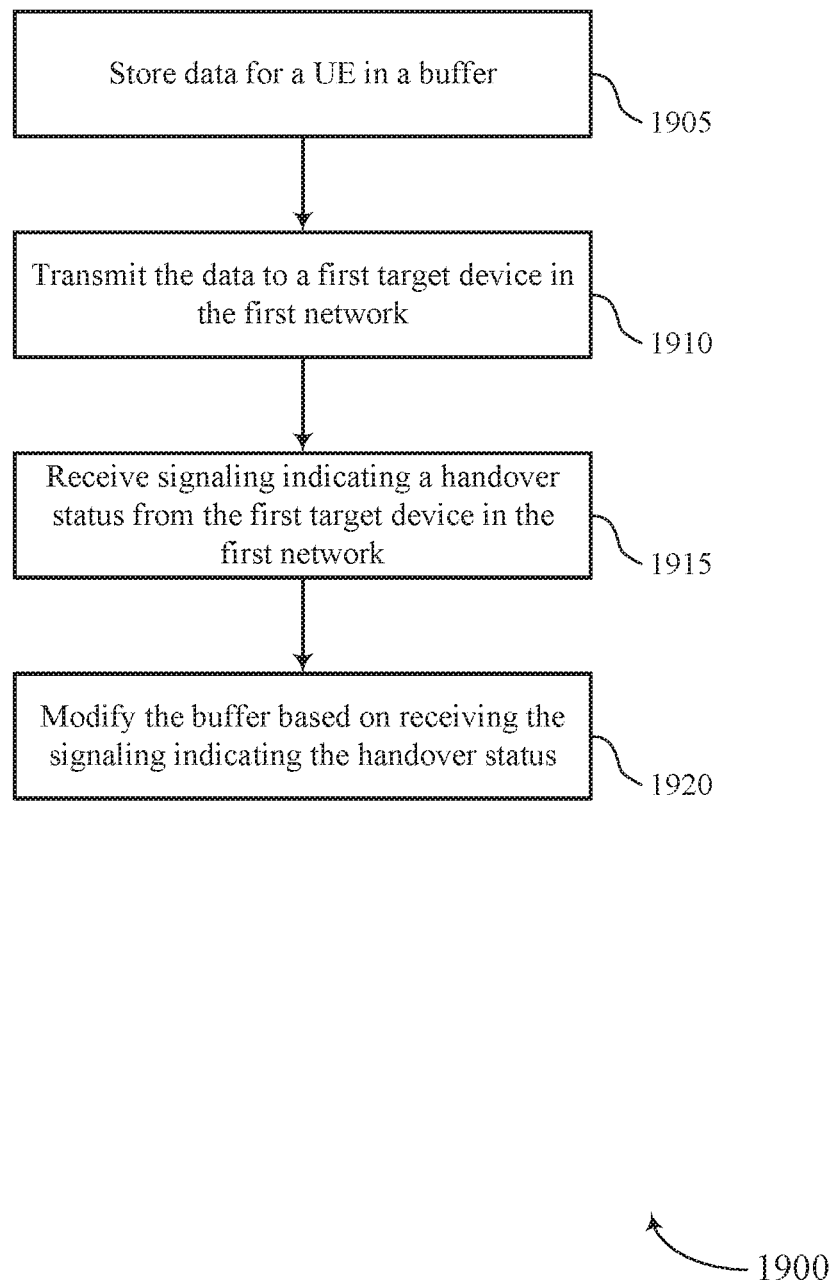

FIG. 19 shows a flowchart illustrating a method 1900 that supports parallel handover and failure handling in accordance with aspects of the present disclosure. The operations of method 1900 may be implemented by a base station 105, an MN 205, an SN 210 or their components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may store data for a UE in a buffer. The operations of 1905 may be performed according to the methods described herein. In some examples, aspects of the operations of 1905 may be performed by a buffer component as described with reference to FIGS. 11 through 14.

At 1910, the base station may transmit the data to a first target device in the first network. The operations of 1910 may be performed according to the methods described herein. In some examples, aspects of the operations of 1910 may be performed by a data communications component as described with reference to FIGS. 11 through 14.

At 1915, the base station may receive signaling indicating a handover status from the first target device in the first network. The operations of 1915 may be performed according to the methods described herein. In some examples, aspects of the operations of 1915 may be performed by a handover status component as described with reference to FIGS. 11 through 14.

At 1920, the base station may modify the buffer based on receiving the signaling indicating the handover status. The operations of 1920 may be performed according to the methods described herein. In some examples, aspects of the operations of 1920 may be performed by a buffer component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Example 1 is a method for wireless communications at a UE may include determining to perform a handover from a first source device in a first network to a first target device in the first network and from a second source device in a second network to a second target device in the second network, wherein the first source device in the first network and the second source device in the second network are in a first dual connectivity configuration and the first target device in the first network and the second target device in the second network are in a second dual connectivity configuration; identifying a time interval for performing a first random access procedure with the first target device in the first network; initiating the first random access procedure with the first target device in the first network; performing a second random access procedure successfully with the second target device in the second network during the time interval; and transmitting to or receiving from the target device in the second network data after performing the second random access procedure successfully and before the UE finishes performing the first random access procedure with the first target device in the first network.

In Example 2, the method of example 1 includes transmitting, after finishing the second random access procedure, a radio resource control connection reconfiguration complete message to the second target device in the second network. In Example 3, the method of any of examples 1-2 further includes finishing the first random access procedure successfully before the end of the time interval and transmitting, after finishing the first random access procedure, a second radio resource control connection reconfiguration complete message to the first target device in the first network. In Example 4, the method of any of examples 1-3 include receiving an acknowledgement message before the end of the time interval based at least in part on transmitting the transmission.

In Example 5, the method of any of examples 1-4 includes finishing the first random access procedure successfully before the end of the time interval and receiving the acknowledgement message before finishing the first random access procedure successfully. In Example 6, the method of any of examples 1-5 includes failing to finish the first random access procedure successfully before an end of the time interval and communicating with the first source device in the first network after failing to finish the first random access procedure successfully. In Example 7, the method of any of examples 1-6 includes receiving an RRC reconnection configuration message; updating a packet data convergence protocol (PDCP) status of the UE based at least in part on the RRC reconnection configuration message; and maintaining the PDCP status of the UE based at least in part on failing to finish the first random access procedure successfully before the end of the time interval, In Example 8, the method of any of examples 1-7 includes transmitting, to the second target device in the second network, an indication that the UE has failed to finish the first random access procedure successfully before the end of the time interval. In Example 9, the communicating with the first source device in the first network of any of examples 1-8 includes transmitting a report to the first source device in the first network indicating one or more packets transmitted by the second target device in the second network that have been successfully received and decoded by the UE. In Example 10, indicating the one or more packets that have been successfully received and decoded by the UE of examples 1-9 includes providing, for each of the one or more packets, an indication of an associated sequence number.

In Example 11, the report of any of examples 1-10 is a PDCP status report. In Example 12, the method of any of examples 1-11 includes receiving a report, from the first source in the first network, indicating one or more packets successfully received by the second target device in the second network from the UE. In Example 13, the first target device in the first network of any of examples 1-12 is an MN and the second target device of the second network of any of examples 1-12 is an SN.

Example 14 is a method for performing wireless communications at a first target device in a first network that includes identifying a DC configuration for the first target device in the first network; performing a random access procedure successfully with a UE; receiving an uplink transmission from the UE or transmitting a downlink transmission to the UE based at least in part on performing the random access procedure successfully; and monitoring for an indication, from a second target device in a second network and after receiving the uplink transmission or transmitting the downlink transmission, that the UE has successfully applied the DC configuration.

In Example 15, the method of examples 14 includes receiving a second indication, from the UE and after performing the random access procedure successfully, that the UE has successfully applied the DC configuration. In Example 16, the method of any of examples 14-15 includes determining that the random access procedure is a CFRA procedure and determining that the UE has successfully applied the DC configuration based at least in part on determining that the random access procedure is the CFRA procedure. In Example 17, the method of any of examples 14-16 includes the first target device in the first network receiving the uplink transmission from the UE and transmitting, to the UE, an acknowledgment message for the uplink transmission before receiving the indication that the UE has successfully applied the DC configuration.

In Example 18, the method of any of examples 14-17 includes the first target device in the first network transmitting the downlink transmission and receiving data from the second target device in the second network, wherein the downlink transmission comprises at least a portion of the data. In Example 19, the method of any of examples 14-18 includes receiving, from the UE, an indication that the UE has failed to finish the first random access procedure successfully before an end of a time interval and transmitting, to the second target device in the second network, an indication of one or more packets transmitted by the UE that have been successfully received and decoded by the first target device in the first network. In Example 20, the method of any of examples 14-19 includes transmitting an indication of a downlink sequence number with the indication of the one or more packets. In Example 21, the method of any of examples 14-20 includes receiving, from the second target device in the second network, the DC configuration; identifying, based at least in part on receiving the DC configuration, a time interval for receiving the indication that the UE has successfully applied the DC configuration; and receiving the uplink transmission or transmitting the downlink transmission during the time interval.

In Example 22, the method of any of examples 14-21 includes failing, by an end of the time interval, to receive the indication that the UE has successfully applied the DC configuration and transmitting, to the second target device in the second network, an indication of one or more packets transmitted by the UE that have been successfully received and decoded by the first target device in the first network. In Example 23, the indicating the one or more packets that have been successfully received and decoded by the first target device in the first network of any of examples 14-22 includes providing, for each of the one or more packets, an indication of an associated sequence number. In Example 24, the first target device in the first network of any of examples 14-23 is an SN and the second target device in the second network of any of examples 14-23 is an MN.

Example 25 is a method for performing wireless communications at a first target device in a first network including receiving data from a first source device in the first network; transmitting the data to a second target device in a second network; receiving, from the second target device in the second network, an indication of one or more packets transmitted by a UE that have been successfully received and decoded by the second target device in the second network; and transmitting the report to the first source device in the first network.

In Example 26, the method of example 25 includes receiving an indication of a downlink sequence number with the indication of the one or more packets and transmitting the indication of the downlink sequence number with the indication of the one or more packets. In Example 27, the method of any of examples 25-26 includes receiving, from the first source device in the first network, a status of a second source device in the second network, where receiving the indication is based on receiving the status of the second source device in the second network. In Example 28, indicating that the one or more packets have been successfully received and decoded by the second target device of the second network of any of examples of 25-27 includes providing, for each of the one or more packets, an indication of an associated sequence number. In Example 29, the indication of any of examples 25-28 is received based at least in part on the first target device in the first network failing to perform a random access procedure successfully with the UE. In Example 30, the first target device in the first network of any of examples of 25-29 and the second target device in the second network of any of examples of 25-29.

Example 31 is a method for performing wireless communications at a first source device in a first network that includes storing data for a UE in a buffer; transmitting the data to a first target device in the first network; receiving signaling indicating a handover status from the first target device in the first network; and modifying the buffer based at least in part on receiving the signaling indicating the handover status.

In Example 32, the signaling of example 31 includes a handover success indication and modifying the buffer of example 31 includes removing the data from the buffer. In Example 33, the signaling of any of examples 31-32 includes an indication that one or more packets transmitted by the UE have been successfully received and decoded by a second target device in a second network.

In Example 34, the method of any of examples 31-33 include receiving, from the UE, a report indicating one or more packets transmitted by a second target device in a second network that have been successfully received and decoded by the UE. In Example 35, modifying the buffer of any of examples 31-34 includes removing at least a portion of the data corresponding to the one or more packets from the buffer and transmitting one or more downlink transmissions to the UE that comprise a second portion of the data unassociated with the one or more packets.

In Example 36, the methods of any of examples 31-35 includes receiving, from the first target device in the first network, a PDCP status of a second target device in a second network and updating the PDCP status of the first source device in the first network based at least in part on receiving the PDCP status. In Example 37, the methods of any of examples 31-36 includes transmitting a downlink transmission to the UE or receiving an uplink transmission from the UE based at least in part on the updated PDCP status.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining to perform a handover from a first source device in a first network to a first target device in the first network and from a second source device in a second network to a second target device in the second network, wherein the first source device in the first network and the second source device in the second network are in a first dual connectivity configuration and the first target device in the first network and the second target device in the second network are in a second dual connectivity configuration;
   identifying a time interval for performing a first random access procedure with the first target device in the first network;
   initiating the first random access procedure with the first target device in the first network;
   performing a second random access procedure successfully with the second target device in the second network during the time interval; and
   transmitting to or receiving from the second target device in the second network data after performing the second random access procedure successfully and before the UE finishes performing the first random access procedure with the first target device in the first network.

2. The method of claim 1, further comprising:
transmitting, after finishing the second random access procedure, a radio resource control connection reconfiguration complete message to the second target device in the second network.

3. The method of claim 2, further comprising:
finishing the first random access procedure successfully before the end of the time interval; and
transmitting, after finishing the first random access procedure, a second radio resource control connection reconfiguration complete message to the first target device in the first network.

4. The method of claim 1, further comprising:
receiving an acknowledgement message before the end of the time interval based at least in part on transmitting the transmission.

5. The method of claim 4, further comprising:
finishing the first random access procedure successfully before the end of the time interval; and
receiving the acknowledgement message before finishing the first random access procedure successfully.

6. The method of claim 1, further comprising:
failing to finish the first random access procedure successfully before an end of the time interval; and
communicating with the first source device in the first network after failing to finish the first random access procedure successfully.

7. The method of claim 6, further comprising:
receiving a radio resource control (RRC) reconnection configuration message;
updating a packet data convergence protocol (PDCP) status of the UE based at least in part on the RRC reconnection configuration message; and
maintaining the PDCP status of the UE based at least in part on failing to finish the first random access procedure successfully before the end of the time interval.

8. The method of claim 6, further comprising:
transmitting, to the second target device in the second network, an indication that the UE has failed to finish the first random access procedure successfully before the end of the time interval.

9. The method of claim 6, wherein communicating with the first source device in the first network comprises:
transmitting a report to the first source device in the first network indicating one or more packets transmitted by the second target device in the second network that have been successfully received and decoded by the UE.

10. The method of claim 9, wherein:
indicating the one or more packets that have been successfully received and decoded by the UE comprises providing, for each of the one or more packets, an indication of an associated sequence number.

11. A method for performing wireless communications at a first target device in a first network, comprising:
identifying a dual connectivity (DC) configuration for the first target device in the first network;
performing a random access procedure successfully with a user equipment (UE);
receiving an uplink transmission from the UE or transmitting a downlink transmission to the UE based at least in part on performing the random access procedure successfully;
monitoring for an indication, from a second target device in a second network and after receiving the uplink transmission or transmitting the downlink transmission, that the UE has successfully applied the DC configuration;
determining that the random access procedure is a contention-free random access (CFRA) procedure; and
determining that the UE has successfully applied the DC configuration based at least in part on determining that the random access procedure is the CFRA procedure.

12. The method of claim 11, further comprising:
receiving a second indication, from the UE and after performing the random access procedure successfully, that the UE has successfully applied the DC configuration.

13. The method of claim 11, wherein the target device in the first network receives the uplink transmission from the UE, and further comprising:
transmitting, to the UE, an acknowledgment message for the uplink transmission before receiving the indication that the UE has successfully applied the DC configuration.

14. The method of claim 11, wherein the first target device in the first network transmits the downlink transmission, and further comprising:
receiving data from the second target device in the second network, wherein the downlink transmission comprises at least a portion of the data.

15. The method of claim 11, further comprising:
receiving, from the UE, an indication that the UE has failed to finish a second random access procedure successfully before an end of a time interval; and
transmitting, to the second target device in the second network, an indication of one or more packets transmitted by the UE that have been successfully received and decoded by the first target device in the first network.

16. The method of claim 15, further comprising:
transmitting an indication of a downlink sequence number with the indication of the one or more packets.

17. The method of claim 11, further comprising:
receiving, from the second target device in the second network, the DC configuration;
identifying, based at least in part on receiving the DC configuration, a time interval for receiving the indication that the UE has successfully applied the DC configuration; and
receiving the uplink transmission or transmitting the downlink transmission during the time interval.

18. The method of claim 17, further comprising:
failing, by an end of the time interval, to receive the indication that the UE has successfully applied the DC configuration; and
transmitting, to the second target device in the second network, an indication of one or more packets transmitted by the UE that have been successfully received and decoded by the first target device in the first network.

19. The method of claim 18, wherein the indicating the one or more packets that have been successfully received and decoded by the first target device in the first network comprises providing, for each of the one or more packets, an indication of an associated sequence number.

20. The method of claim 11, wherein the first target device in the first network is a secondary node (SN) and the second target device in the second network is a master node (MN).

21. An apparatus for wireless communication at a user equipment (UE), comprising:
a processor, memory coupled with the processor; and instructions stored in the memory and executable by the processor to cause the apparatus to:

determine to perform a handover from a first source device in a first network to a first target device in the first network and from a second source device in a second network to a second target device in the second network, wherein the first source device in the first network and the second source device in the second network are in a first dual connectivity configuration and the first target device in the first network and the second target device in the second network are in a second dual connectivity configuration;

identify a time interval for performing a first random access procedure with the first target device in the first network;

initiate the first random access procedure with the first target device in the first network;

perform a second random access procedure successfully with the second target device in the second network during the time interval; and transmit to or receive from the second target device in the second network data after performing the second random access procedure successfully and before the UE finishes performing the first random access procedure with the first target device in the first network.

22. The apparatus of claim 21, wherein the instructions are further executable by the processor to cause the apparatus to:

transmit, after finishing the second random access procedure, a radio resource control connection reconfiguration complete message to the second target device in the second network.

23. The apparatus of claim 22, wherein the instructions are further executable by the processor to cause the apparatus to:

finish the first random access procedure successfully before the end of the time interval; and transmit, after finishing the first random access procedure, a second radio resource control connection reconfiguration complete message to the first target device in the first network.

24. The apparatus of claim 21, wherein the instructions are further executable by the processor to cause the apparatus to:

receive a report, from the first source in the first network, indicating one or more packets successfully received by the second target device in the second network from the UE.

25. The apparatus of claim 21, wherein the first target device in the first network is a master node (MN) and the second target device in the second network is a secondary node (SN).

26. An apparatus for performing wireless communications at a first target device in a first network, comprising:

a processor, memory coupled with the processor; and instructions stored in the memory and executable by the processor to cause the apparatus to:

identify a dual connectivity (DC) configuration for the first target device in the first network;

perform a random access procedure successfully with a user equipment (UE);

receive an uplink transmission from the UE or transmitting a downlink transmission to the UE based at least in part on performing the random access procedure successfully;

monitor for an indication, from a second target device in a second network and after receiving the uplink transmission or transmitting the downlink transmission, that the UE has successfully applied the DC configuration;

receive, from the UE, an indication that the UE has failed to finish the first random access procedure successfully before an end of a time interval; and transmit, to the second target device in the second network, an indication of one or more packets transmitted by the UE that have been successfully received and decoded by the first target device in the first network.

27. The apparatus of claim 26, wherein the instructions are further executable by the processor to cause the apparatus to:

receive a second indication, from the UE and after performing the random access procedure successfully, that the UE has successfully applied the DC configuration.

28. The apparatus of claim 26, wherein the instructions are further executable by the processor to cause the apparatus to:

determine that the random access procedure is a contention-free random access (CFRA) procedure; and determine that the UE has successfully applied the DC configuration based at least in part on determining that the random access procedure is the CFRA procedure.

29. The apparatus of claim 26, wherein the instructions are further executable by the processor to cause the apparatus to:

transmit an indication of a downlink sequence number with the indication of the one or more packets.

30. The apparatus of claim 26, wherein the instructions are further executable by the processor to cause the apparatus to:

receive, from the second target device in the second network, the DC configuration;

identify, based at least in part on receiving the DC configuration, a time interval for receiving the indication that the UE has successfully applied the DC configuration; and receive the uplink transmission or transmitting the downlink transmission during the time interval.

31. The apparatus of claim 30, wherein the instructions are further executable by the processor to cause the apparatus to:

fail, by an end of the time interval, to receive the indication that the UE has successfully applied the DC configuration; and transmit, to the second target device in the second network, an indication of one or more packets transmitted by the UE that have been successfully received and decoded by the first target device in the first network.

32. The apparatus of claim 31, wherein the indicating the one or more packets that have been successfully received and decoded by the first target device in the first network comprises providing, for each of the one or more packets, an indication of an associated sequence number.

33. An apparatus for wireless communication at a user equipment (UE), comprising:

means for determining to perform a handover from a first source device in a first network to a first target device in the first network and from a second source device in a second network to a second target device in the second network, wherein the first source device in the first network and the second source device in the second network are in a first dual connectivity configuration and the first target device in the first network and the second target device in the second network are in a second dual connectivity configuration;

means for identifying a time interval for performing a first random access procedure with the first target device in the first network;

means for initiating the first random access procedure with the first target device in the first network;

means for performing a second random access procedure successfully with the second target device in the second network during the time interval; and means for transmitting to or receiving from the second target device in the second network data after performing the second random access procedure successfully and before the UE finishes performing the first random access procedure with the first target device in the first network.

* * * * *